US011559818B2

(12) United States Patent
Thomas et al.

(10) Patent No.: US 11,559,818 B2
(45) Date of Patent: Jan. 24, 2023

(54) CELL WASHING DEVICE AND METHOD

(71) Applicant: Beckman Coulter, Inc., Brea, CA (US)

(72) Inventors: Richard Thomas, Miami, FL (US); Valentin Quesada, Miami Lakes, FL (US); Michael Thomas, Davie, FL (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 16/468,487

(22) PCT Filed: Dec. 14, 2017

(86) PCT No.: PCT/US2017/066312
§ 371 (c)(1),
(2) Date: Jun. 11, 2019

(87) PCT Pub. No.: WO2018/112145
PCT Pub. Date: Jun. 21, 2018

(65) Prior Publication Data
US 2019/0308203 A1    Oct. 10, 2019

Related U.S. Application Data

(60) Provisional application No. 62/434,748, filed on Dec. 15, 2016.

(51) Int. Cl.
*B04B 5/04* (2006.01)
*B01L 3/02* (2006.01)
(Continued)

(52) U.S. Cl.
CPC ............ *B04B 5/0407* (2013.01); *B01F 35/20* (2022.01); *B01L 3/0293* (2013.01);
(Continued)

(58) Field of Classification Search
CPC ....... B04B 5/0407; B04B 11/60; B04B 11/00; B01L 3/0293; B01L 3/5021;
(Continued)

(56) References Cited

U.S. PATENT DOCUMENTS 4,296,882 A * 10/1981 Kobayashi ............ B04B 5/0442
366/219
4,373,931 A * 2/1983 Takekawa .......... G01N 33/5304
422/918

(Continued)

FOREIGN PATENT DOCUMENTS

CN    102802804 A    11/2012
EP       0058436 A2    8/1982
(Continued)

OTHER PUBLICATIONS

PCT/US2017/066312, "International Search Report and Written Opinion", dated Feb. 21, 2018, 12 pages.
(Continued)

*Primary Examiner* — Liam Royce
(74) *Attorney, Agent, or Firm* — Merchant & Gould P.C.

(57) ABSTRACT

A cell washer is disclosed. The cell washer includes a vessel configured to hold cells. The vessel includes an elongated body including an opening, an inner surface, and a pocket defined by a first inner surface portion of the inner surface disposed between and radially outward relative to a second inner surface portion and a third inner surface portion of the inner surface, and a cavity. The vessel also includes an actuating device capable of causing the vessel to spin about an axis.

22 Claims, 18 Drawing Sheets

(51) Int. Cl.
*B01F 35/20* (2022.01)
*B01D 21/26* (2006.01)
*B01L 3/00* (2006.01)
*B04B 11/06* (2006.01)

(52) U.S. Cl.
CPC ........... *B01D 21/262* (2013.01); *B01L 3/5021* (2013.01); *B01L 2200/0647* (2013.01); *B01L 2400/0409* (2013.01); *B01L 2400/0487* (2013.01); *B04B 5/0442* (2013.01); *B04B 11/06* (2013.01)

(58) Field of Classification Search
CPC ..... B01L 2400/0487; B01L 2400/0409; B01L 2200/0647; B01F 15/00123; B01D 21/262
See application file for complete search history.

(56) References Cited

U.S. PATENT DOCUMENTS

| | | |
|---|---|---|
| 2005/0054506 A1 | 3/2005 | Bradley |
| 2017/0266664 A1* | 9/2017 | Lukhaub ................ B01L 3/523 |

FOREIGN PATENT DOCUMENTS

| | | |
|---|---|---|
| JP | 55-114362 A | 9/1980 |
| JP | 56-54355 A | 5/1981 |
| JP | 3140867 | 6/1991 |
| JP | 2001-512967 | 8/2001 |
| JP | 2012044939 | 3/2012 |
| JP | 2010524498 | 9/2013 |
| WO | 98/35758 | 8/1998 |
| WO | 2006/130760 | 12/2006 |
| WO | 2012029273 | 3/2012 |
| WO | 2015/063489 | 5/2015 |
| WO | 2016/016345 | 2/2016 |

OTHER PUBLICATIONS

European Patent Office; Examination Report (Article 94(3) EPC) for European Patent Application No. 17825351.4; dated Nov. 3, 2020; 4 pages.

* cited by examiner

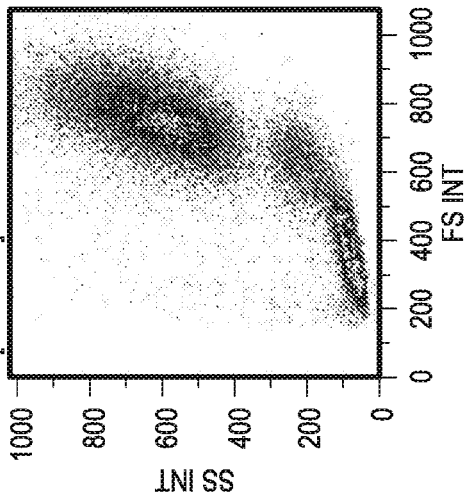
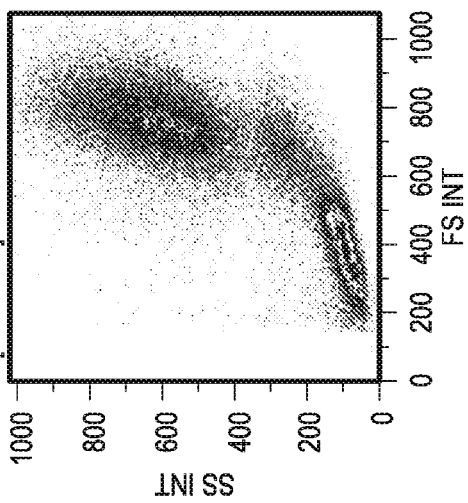
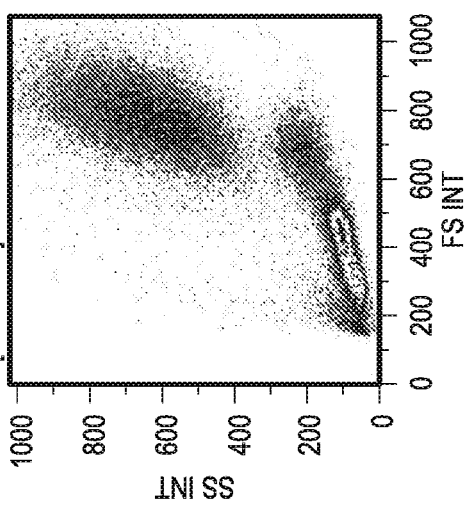
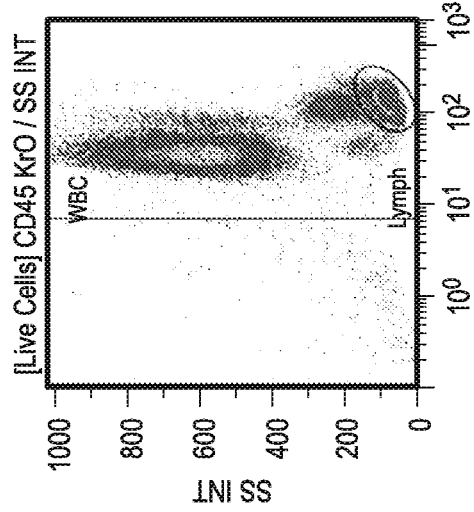
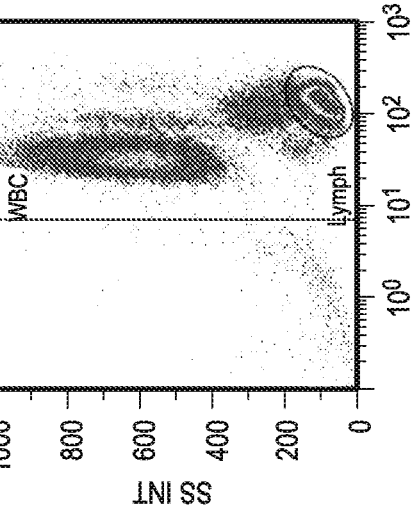
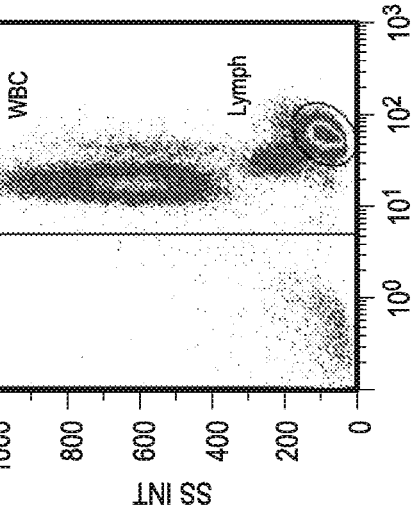

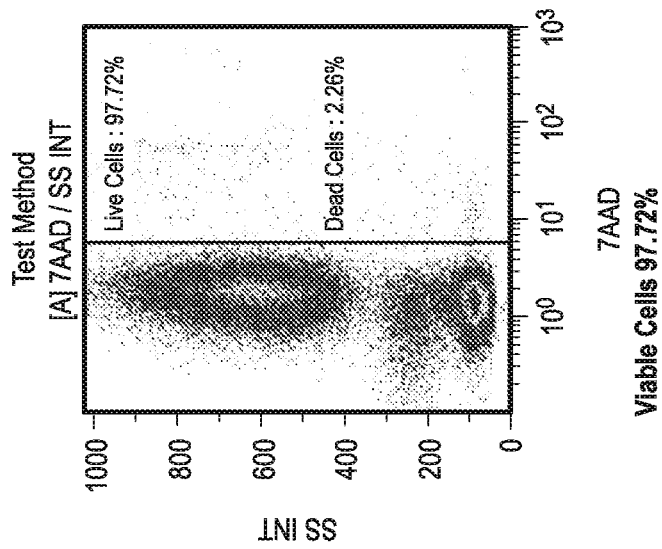
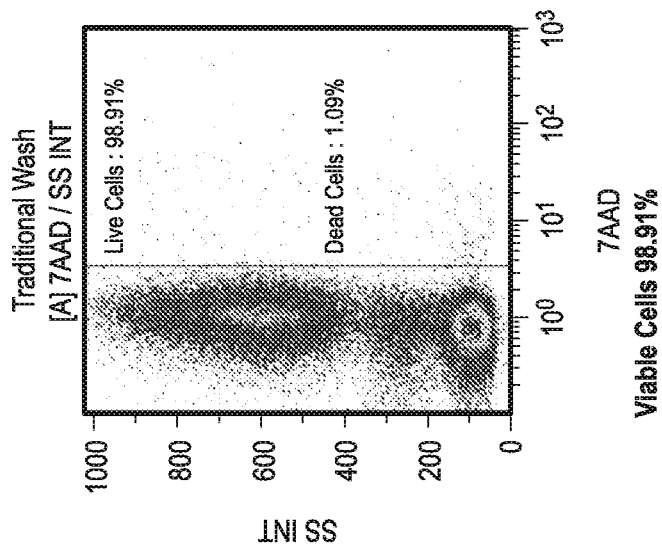
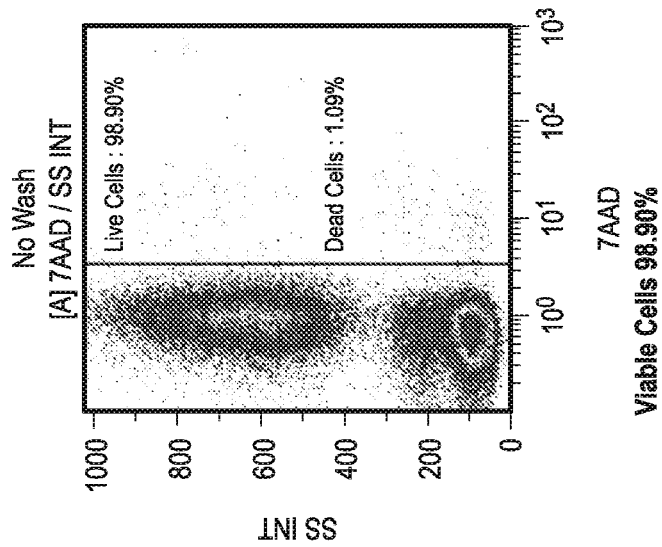
FIG. 10C
FIG. 10B
FIG. 10A

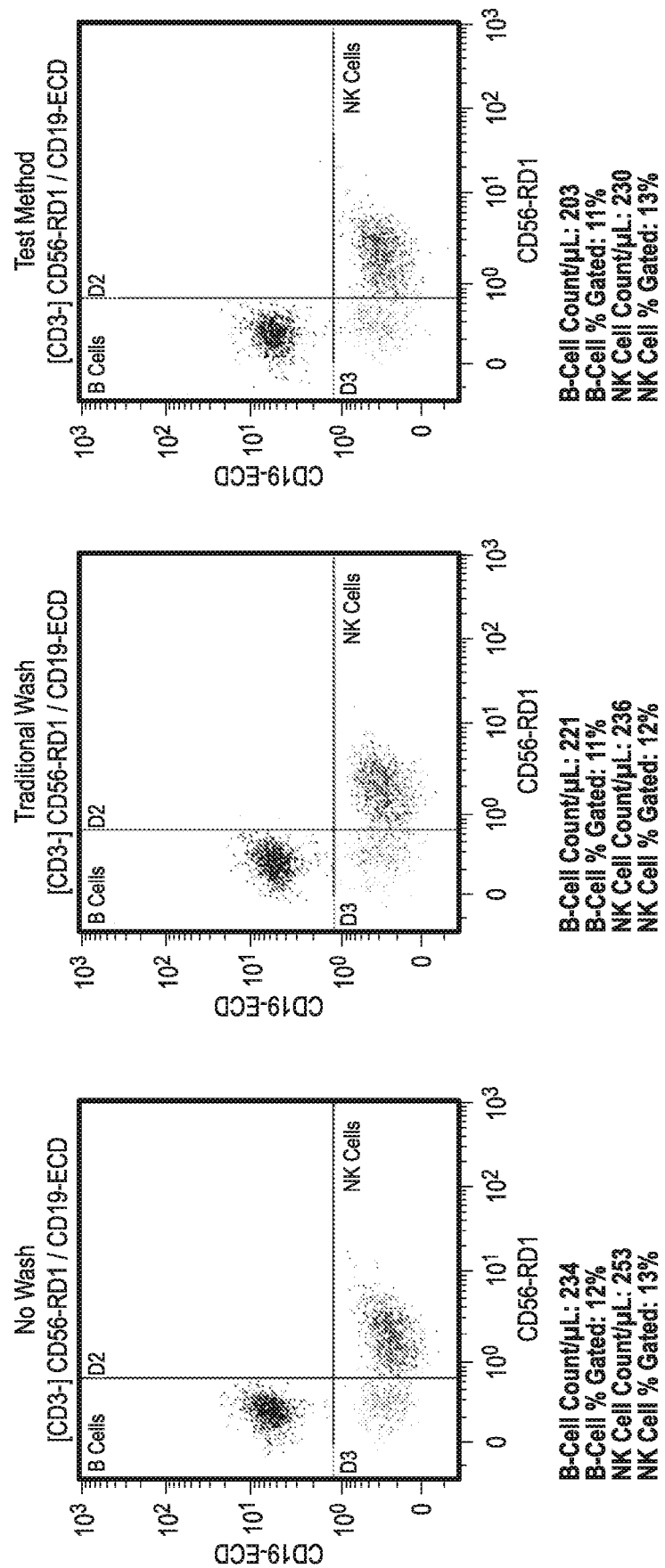

CELL WASHING DEVICE AND METHOD

CROSS-REFERENCE TO RELATED APPLICATIONS

This application is US National Phase entry of PCT/US2017/066312 filed Dec. 14, 2017, which is a non-provisional of and claims priority to U.S. provisional application 62/434,718, filed on Dec. 15, 2016, both of which are hereby incorporated in their entireties for all purposes.

TECHNICAL FIELD

Embodiments of the invention relate to the field of particle preparation, and more particularly to devices and methods for washing cells.

BACKGROUND

Particle analysis generally, and cellular analysis in particular, frequently requires removing or replacing liquids that suspend particles or cells. This is useful to remove interfering substances, excess stains, unbound labeled antibodies, detergents, permeabilizing agents, lysing agents, fixatives, neutralizing agents, and other materials. In some situations, cell washing may also be useful to reduce unwanted interactions between cell types mediated by dissolved materials.

Traditional methods for particle or cell washing involve a variety of processes such as sedimenting and decanting, acoustic separation, centrifugation, filtration, flow through structured channels, and magnetic separation. These methods are difficult to automate, bulky, time-consuming, and frequently need single-use consumables. There is a thus a need for an easily automated process and device for cell washing.

A purpose of cell washing is to remove unwanted substances that may affect further processing or subsequent analysis. Cell washing generally involves removal of a suspending liquid and resuspension of the cells in a replacement liquid, generically called a wash liquid. Cell washing may use different wash liquids at different portions of the wash process and may also include extended exposure to selected wash liquids or agitation to encourage transfer of unwanted substances.

Cell washing may lose, injure, activate, alter, or destroy cells, may cause undesirable interaction between cells, or may differentially deplete a sample of certain cell types. These effects can alter the results of subsequent analysis. For example, exposure of cells to high accelerations (such as that produced by inertial effects of high-speed rotation or "centrifugal force") or high fluid shear rate can rupture some cell types more than others. An assay of a washed cell mixture thus may not accurately reflect the proportions of cells present in the original sample. There is a thus a need for a process and device for cell washing that preserves the properties and proportions of a wide variety of cells in a sample.

Wash efficacy is one measure of the quality of a wash procedure. A wash has a high efficacy if it removes more of the unwanted substances. A process with low wash efficacy leaves more of the unwanted substances. Multiple instances of a process may in some cases be chained to improve the wash efficacy of the combined process. A simple dilution model, though not realistic for all wash processes, serves to illustrate the concept of wash efficacy. If a wash process leaves at the end of the wash a fraction d of the fluid present at the start of a wash, then after n iterations, the fraction of the original fluid (including the original unwanted substances) remaining is $(d)^n$. The wash efficacy may be expressed as the inverse of the fraction remaining: in this case $1/d$ for a single process and $1/d^n$ for the multiple iteration process. For example, if a wash process leaves 10% of the original liquid after one iteration, its wash efficacy may be expressed as $1/0.1=10$. Four iterations of such a wash process gives an ideal combined wash efficacy of $1/0.1^4=10,000$.

However, wash steps may not be chained without consequence: additional wash iterations take additional time and may increase the likelihood of cellular alteration or loss. Further, the resuspension process may be particularly damaging to cells as it typically relies upon high fluid shear. There is a thus a need for a process and device for cell washing that efficaciously washes cells with fewer wash iterations and hence fewer instances of resuspension.

Cells may be sensitive to the magnitude and duration of applied forces during washing; extended exposure to high forces causes more damage to cells. However, in centrifugal cell washers, the time for cells to sediment under an applied force decreases as the force increases. There is thus a need for a cell washer device and process that reduces the exposure of cells to high forces for extended times.

Living cells are generally slightly denser than aqueous wash liquids. In centrifugal cell washers, the denser cells sediment through the wash liquids in regions of high relative force. A wash protocol in a centrifugal cell washer usually includes repeated cycles of sedimenting the cells, removing as much as possible of the wash liquid, and resuspending the cells in fresh wash liquid. The time required to sediment cells depends on the distance the cells travel through the wash liquid and is hence longer with larger volumes of wash liquids present before sedimentation. It is therefore desirable to sediment from an initially small volume of wash liquid. The wash efficacy of such a process is limited by the amount of wash liquid remaining after each removal step (an amount usually limited by mechanical constraints) as compared to the total volume of wash liquid exposed to the cells. Thus it would be beneficial to sediment the cells from an initial low volume of wash liquid but to expose the cells to additional wash liquid after sedimentation. However, once the cells are sedimented to a region of high relative force, additional wash liquid cannot appreciably interact with cells because the force causes the less dense liquid to float "above" the cells. There is thus a need for a cell washer device and process that permit interaction of additional wash liquid with cells undergoing wash during a single wash iteration.

In centrifugal cell washing, use of closed containers requires complex rotating connections to add or remove liquids. However open containers permit liquids to escape unless the container volume is large compared to the contained volume. There is thus a need for an open-container cell washer that accommodates relatively large volumes of liquids.

Embodiments of the invention solve these and other problems individually and collectively.

SUMMARY

In some embodiments, the invention includes a cell washer having a vessel to hold cells. The vessel includes an elongated body defining an opening, a cavity, and a pocket. The opening communicates with the cavity, and the cavity communicates with the pocket. The pocket can extend radially outward relative to the portion of the elongated body defining the cavity. The pocket can be symmetric about a vertically oriented axis. The elongated pocket has a radial depth that extends beyond the side walls forming the cavity. The pocket can have an aspect ratio (e.g., length to depth, when viewed from an axial cross-section) of about 2:1, 4:1, 10:1, or 15:1 or more. An actuating device such as a rotor can spin the vessel about the axis.

The cavity may be defined at least in part by a cylindrical section of the body and may be positioned below the pocket. The inner surface defining forming the cavity may transition to the pocket as a sigmoid-shaped transition.

The cell washer may also include a conduit that passes through the opening and into the cavity. The conduit is configured to transfer fluid to and from the cavity during rotation of the vessel. The conduit ends in a tip that may be disposed adjacent an interior wall of the vessel and below the pocket. The conduit may be disposed off of the axis and parallel to the axis. The conduit may be fluidically coupled to a fluid pump.

The vessel may also include an upper annular region defined by an upper portion of the body. The upper annular region may be disposed between the pocket and the opening.

In some embodiments, the cell washer may also include a probe mounted on an elevator with the elevator configured to lower the probe through the opening. A sample pump may be in fluid communication with the probe. The pump and probe allow for the addition or removal of material from the vessel. A controller can be electrically connected to the actuating device (e.g., rotor), the fluid pump, the sample pump, and the elevator can control the operation of these components.

Embodiments of the invention the invention also include a method including washing cells from a sample including cells suspended in a liquid. The method has steps of dispensing the sample into a vessel including a cavity and a pocket, where the cavity and the pocket are disposed about an axis that is vertically oriented. The pocket can be positioned radially outward with respect to a portion of the body forming the cavity. Other steps include rotating the vessel at a first speed about the vessel's axis, displacing the cells into the pocket, sedimenting the cells toward the wall of the pocket, and withdrawing at least part of the liquid.

The step of displacing the cells into the pocket includes adding a first aliquot of a wash liquid to the vessel. The wash liquid is added through a conduit extending into the vessel and terminating below the pocket. The step of withdrawing includes aspirating through the same conduit at a different time.

Other steps may include adding a second or subsequent aliquot of a wash liquid through the conduit and resuspending the cells. In some embodiments, the steps of withdrawing at least part of the liquid from the vessel and of adding a second (or subsequent) aliquot of wash liquid may be repeated one or more times to provide a more efficacious wash. For example, the steps can be repeated between 2 and 5 times in some embodiments of the invention.

The step of rotating the vessel at the first speed produces a force in the pocket of at least about 100, or 250×g. The method of washing cells may also include rotating the vessel at a second speed during the withdrawing step. This rotation at a second speed may produce a force in the pocket of at least about 25×g. Thus, in some embodiments, the subsequent vessel rotation speeds can decrease with each successive wash step.

The step of resuspending the cells may include sub-steps of adding a resuspension liquid, and stopping the rotation. In some embodiments, the rotation may be abruptly reversed in direction to assist in resuspending the cells. Washed cells may be removed once the rotation is stopped.

The volume of the sample may be less than the volume of the cavity below the pocket, and in some embodiments, may be less than about 0.7 times this volume below the pocket. The volume of the resuspension liquid may be less than the volume of the sample so that, after washing, the washed cells are suspended at a higher concentration than were the cells in the sample before the wash.

The method may include additional steps to clean the vessel for subsequent use, including steps of adding a rinse liquid, rotating the vessel at a third speed, and aspirating the rinse liquid through the conduit. The step of cleaning the vessel may include varying the speed of rotation during the step of aspirating the rinse liquid.

The wash liquid or the resuspension liquid may include an suitable material. For example, it may include about 5 mM EDTA and may also include about 0.1% to about 2% fetal calf serum. In some embodiments, the wash solution is comprised of an isotonic buffer (e.g., PBS), an anticoagulant (e.g., EDTA), and a protein (e.g., fetal bovine serum). In some embodiments, fetal calf serum can server as the protein.

BRIEF DESCRIPTION OF THE DRAWINGS

FIG. 7 shows scatter plots of white blood cell recovery using embodiments of the device and method of the invention compared to traditional wash and to no wash.

FIG. 10 shows cell viability using embodiments of the device and method of the invention compared to traditional wash and to no wash.

FIG. 14 shows B cell and NK cell recovery using embodiments of the device and method of the invention compared to traditional wash and to no wash.

DETAILED DESCRIPTION

Figure 1A:
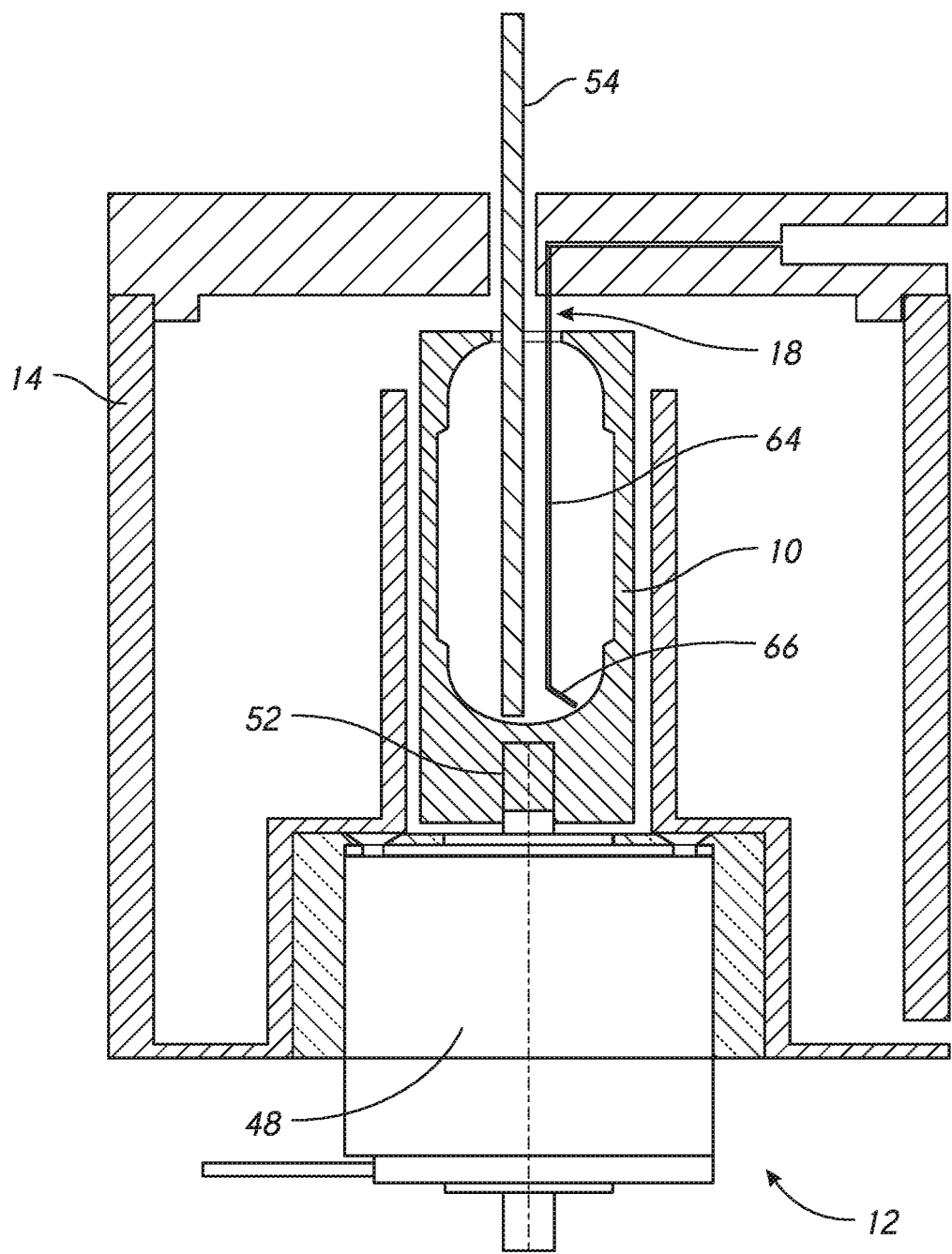
FIGS. 1A and 1B shows diagrammatic side sectional views of an embodiment of the device of the invention.
Figure 1B:
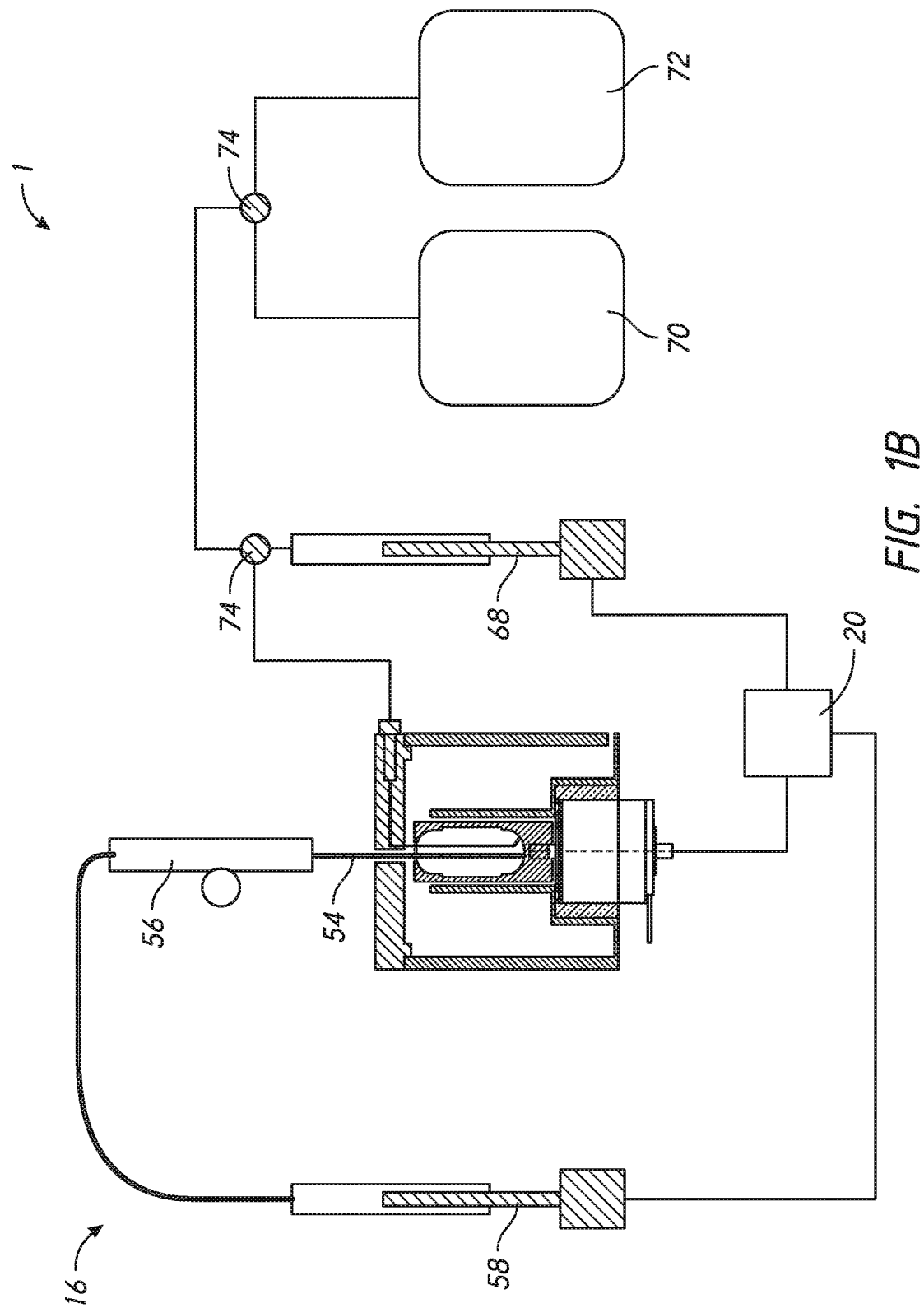

FIGS. 1A and 1B show diagrammatically an embodiment of the cell washer according to an embodiment of the invention. Cell washer 1 includes vessel 10 comprising a body, a rotor 12, conduit 18, and controller 20. In some embodiments, cell washer 1 may also include pipettor 16 and housing 14.

Figure 2:
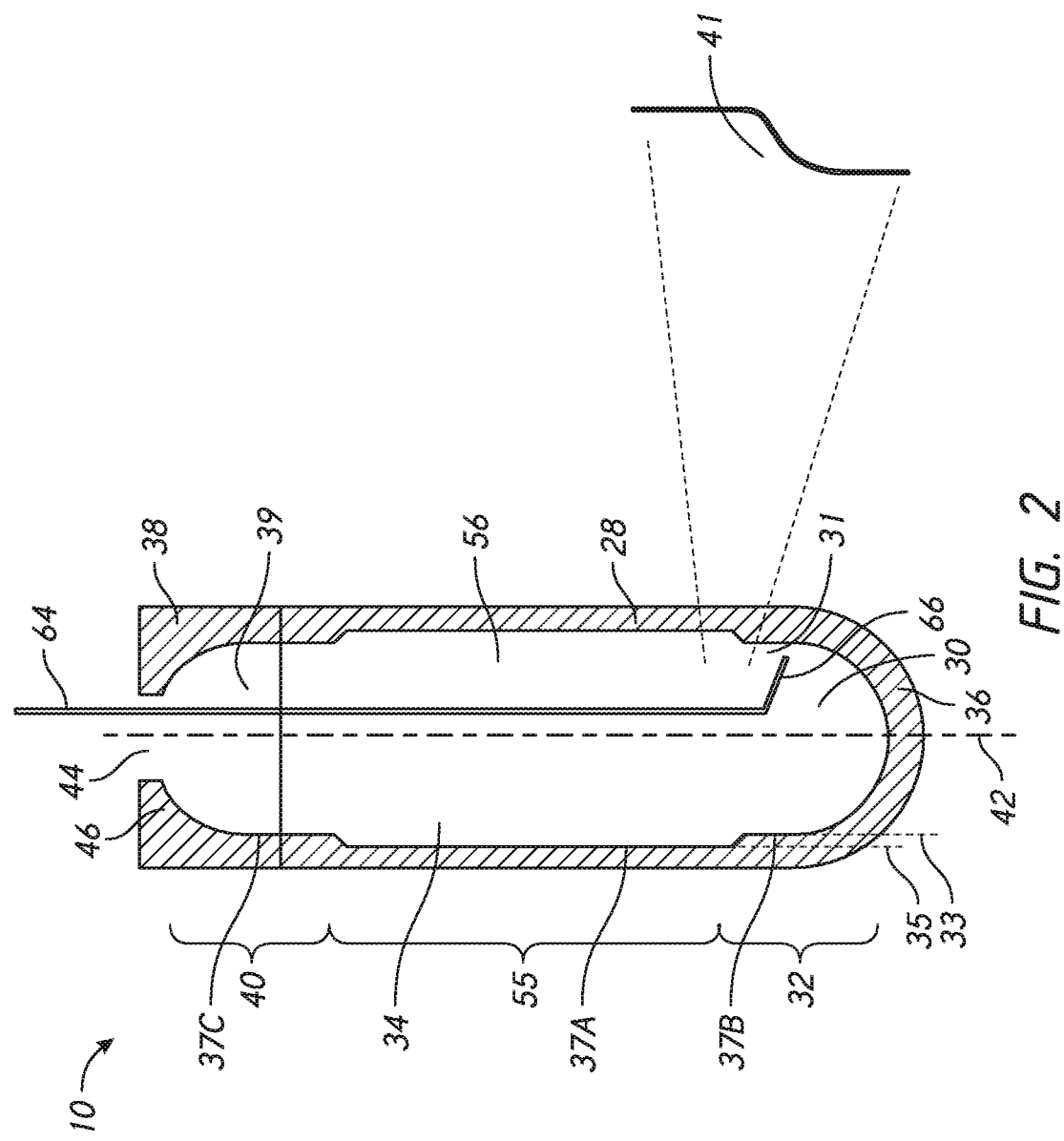
FIG. 2 shows a diagrammatic side sectional view of the vessel of the embodiment of FIG. 1.

FIG. 2 shows vessel 10 in more detail. Vessel 10 comprises an elongated body that can be configured to contain the cell sample and wash liquids during the wash process. Vessel 10 can be oriented with its long axis 42 vertical during operation. Vessel 10 includes a closed bottom 36, an open top 38, and a wall 28 extending between bottom 36 and top 38. Wall 28 defines a cavity 30 and a pocket 34.

In this document, the inner surface of the wall 28 can refer to a portion of vessel 10 bounding cavity 30 or pocket 34. The outer surface of the wall 28 can refer to a portion of vessel 10 separated from cavity 30 or pocket 34 by some portion of wall 28.

In this document, pocket 34 is denoted separately from cavity 30 even though these two features are defined by an inner surface of a body of the vessel 10. The inner surface of the body may include a first inner surface portion 37A that disposed between and radially outward relative to a second inner surface portion 37B and a third inner surface portion 37C to form pocket 34. Cavity 30, which may taper towards axis 42, is differentiated from pocket 34 by the respective radii of their defining surface portions 37A, 37B. For example, a first inner surface portion 37A may define at least part of the pocket 34, while a second inner surface portion 37B may define at least part of the cavity. As show in FIG. 2, the first inner surface portion 37A is further away (in a radial sense) from the long axis 42 than the second inner surface portion 37B. In the embodiment in FIG. 2, the pocket radius of the bottom of the pocket 34 (which corresponds to a middle inner sidewall of the body of the vessel 10) is substantially constant (other than transition zones at one or both ends of pocket 34, the transition zones being between the first and second inner surface portions 34A, 34B, and the first and third inner portions 34A, 34C) over the axial extent of pocket 34. The radius of the bottom of the pocket 34 may also be constant over most or all of its axial extent, in which case the space formed by the pocket 34 may form a cylindrical shell of defined thickness (the depth of the pocket). The hollow or void inside of vessel 10 may include cavity 30 as well as an upper annular region 39, which may be defined by an upper section 40 of the body of the vessel 10. The extent of pocket 34 includes any transition zone that may be small (less than about one tenth the axial extent of the pocket) with respect to the axial extent of the pocket. The aspect ratio of the pocket may be greater than about 2:1, 3:1, 5:1, 10:1 or 15:1 (e.g., where the aspect ratio is the length:depth). The radius can change between the radius of the surrounding areas of cavity 30 and the increased radius of pocket 34.

Wall 28 and the body in which the wall 28 is included may be formed of stable solid materials such as glass, polycarbonate, or acrylic plastic. In some embodiments, use of high density polyethylene improves wash efficacy due to reduced adhesion. Transparency is beneficial during process development as fluid behavior and cleanliness may be observed through wall 28 during operation.

In some embodiments, vessel 10 and cavity 30 are symmetrical about axis 42. The outer surface of wall 28 may be similar in shape to the inner surface of wall 28 so that wall 28 is of relatively constant thickness. This has the benefit of reducing the mass of vessel 10 and thus reducing the torque required to spin vessel 10. The outer surface of wall 28 (and hence of vessel 10) may include a cylindrical profile and may terminate in a hemispherical bottom end, so that the outer surface of vessel 10 is similar in shape to a conventional test tube.

In some embodiments, cell washer 1 may be designed to process samples having volume on the order of 1 mL. In such embodiments, cavity 30 may fit within a cylindrical envelope of about 0.35 inches diameter and about 2 inches tall. However, in other embodiments, cell washer 1 may be either larger or smaller for other sample sizes by scaling to maintain forces and relative volumes.

The inner surface (which may correspond to a second inner surface portion 37B) of wall 28 can define at least part of a lower portion 32 of the vessel as well as the cavity 30. In some embodiments, an upper annular region 39 may be present in an upper portion 40 of the vessel 10. Lower portion 32, middle portion 55, and upper portion 40 are disposed along different axial lengths of vessel 10. Lower portion 32 including the cavity 30 extends upward from the inner surface of bottom 36. Middle portion includes a central annular region 56 including the pocket 34 and begins above lower portion 32 and extends further upward. Upper portion 40 includes the annular region 39, and when present, begins above central annular region 56 and extends further upward to the inner surface of open top 38. Wall 28 bounding cavity 30 may be formed with a smooth inner surface, without sharp inside corners to avoid trapping any cells or liquid during use. The minimum inside corner radius can depend on the surface properties of the wall material and the ability of liquids within vessel 10 to wet that wall material. In some embodiments, using aqueous fluids in polycarbonate vessels, the minimum inside corner radius may be about 0.03 inches. A benefit of separating pocket 34 from lower portion 32 is that pocket 34 provides a location where centrifugal force confines the particles at a position separate from where liquids are added or removed. This prevents unintended removal of particles during the wash process, increasing recovery.

Bottom 36 is the closed end of the elongated body that forms vessel 10. Bottom 36 is positioned downward during operation of cell washer 1. Directions in this description refer to this orientation. The outer surface of wall 28 at bottom 36 is the physical bottom of vessel 10. The inner surface of wall 28 at bottom 36 is the physical bottom of cavity 30.

Lower portion 32 begins at the intersection of axis 42 and the inner surface of wall 28 at bottom 36. A purpose of lower portion 32 is to allow selected addition or removal of liquids without affecting the cells. Cells may be retained in pocket 34 under the influence of centrifugal force while fluids are added to and removed from lower portion 32. The inner surface of wall 28 tapers smoothly and monotonically outward from axis 42 and upward from bottom 36 until it reaches a lower radius 33. Lower radius 33 is the maximal inside radius of lower portion 32. Lower portion 32 may continue further at lower radius 33 to form a cylindrical section 31 of lower portion 32 or may terminate at the transition to pocket 34. In some embodiments, lower portion 32 is similar in shape to a test tube, with a curved lower portion and a cylindrical upper portion. In such embodiments, the radius of the cylindrical upper portion corresponds to lower radius 33. The curved lower portion may be substantially hemispherical, parabolic, or any other profile that transitions from the intersection of centerline with bottom 36 to pocket radius 35. The volume of lower portion 32 may be large enough to contain the entirety of the sample containing the cells to be washed. A benefit of lower portion 32 tapering is that the outwardly directed centrifugal force urges the relatively dense cells or particles upward along the taper towards pocket 34. A second benefit is that the liquid flows to the bottom center when rotation stops, improving recovery by probe 54.

Pocket 34 can form part of the central annular region 56 of the region of the interior of vessel 10 that has the largest internal radius. A purpose of pocket 34 is to contain the cells during the wash process in a limited volume so that suspending liquids may be interchanged without loss of cells. Pocket 34 may have essentially constant inside radius (pocket radius 35) except for where it joins to lower portion 32 (and to upper portion 40 if present). In other embodiments, pocket 34 may have other shapes. For example, pocket 34 may be slightly ellipsoidal so that cells preferentially sediment to the "deep" portion of the ellipsoid. This may be useful when the sample has very low cell concentrations. Still other shapes may be useful in other applications.

In embodiments, the inner surface of wall 28 at the boundary of lower portion 32 and pocket 34 may form a sigmoid-shaped transition 41 (as viewed in an axial cross section as shown in FIG. 2). The benefit of the sigmoid-shaped transition 41 is that it reduces the trapping or hang-up of particles as they move between pocket 34 and lower portion 32. This increases recovery and reduces carryover between samples.

In an embodiment with a cylindrical segment in pocket 34, the active volume of pocket 34 is the difference between the volume of cavity 30 between the ends of pocket 34 and the volume of a cylinder having radius equal to lower radius 33 between the ends of pocket 34. The active volume is thus a cylindrical shell with one or two sigmoid-shaped tapering ends. A benefit of the cylindrical segment is that cells may be packed in a thin layer, making cleaning easier and subjecting cells to similar g-forces for a given rotation rate. Another benefit of the cylindrical segment is elimination of trapped volumes of fluid, improving wash efficacy.

In some embodiments, pocket 34 includes an active volume at least equal to the aggregate volume of cells or particles in the sample. In other embodiments, pocket 34 includes an active volume at least equal to the total volume of the sample. This permits the entirety of a sample to fit within pocket 34 during cell sedimentation, supporting such sedimentation at near constant radius (and thus near constant force) irrespective of the fraction of the sample that is cellular. In still other embodiments, pocket 34 includes an active volume at least equal to about 1.4 times the total volume of the sample. This greater volume supports sedimentation at near constant radius even if the sample were diluted during the upward displacement step described in more detail below.

Upper portion 40, when present, begins above pocket 34 and extends to top end 38. A purpose of upper portion 40 is to provide a location to accommodate wash liquid that had traversed pocket 34 so that cells in pocket 34 may be exposed to fresh wash liquid. Upper portion 40 tapers smoothly and monotonically inwardly from pocket 34 and merges with top end 38 so that radial forces tend to force any relatively high density materials into pocket 34. The volume of upper portion 40 may be similar to that of lower portion 32 to receive fluids first supplied to lower portion 32. In some embodiments, upper portion 40 may have a larger volume than lower portion 32 because the roughly parabolic profile of the fluid-free margin consumes a larger fraction of the volume of upper portion 40 than it does of lower portion 34. Upper portion 40 and the lower portion 32 may include cylindrical segments having about the same radius. A benefit of the paired upper and lower portions surrounding a pocket is that they allow wash liquid added in lower portion 32 to sweep through the cells confined in pocket 34, rinsing the cells and sweeping the dirty wash liquid away from the cells. This increases wash efficacy while minimizing wash liquid volume.

When vessel 10 spins about axis 42, the fluid contents of vessel 10 distribute radially outward and upward under the combined influence of centrifugal force and gravity. The fluid contents forms a cup-shaped hollow shell bounded by wall 28 on the outside, by bottom 36 below, by annular lip 46 above, and by a free fluid margin centrally. The fluid-free margin assumes a roughly parabolic shape with parameters determined by the speed of rotation, by the surface tension of the fluid, and by the contact angle of the wall material with respect to the fluid. V. A. Lubarda published a detailed analysis of the shape of the fluid-free margin in Acta Mech (2013) 224: 1365, the entirety of which is hereby incorporated by reference. As rotation speed increases, the parabolic edge of the fluid-free boundary descends toward bottom 36, and may contact bottom 36 so that the fluid is distributed in an open shell.

Top end 38 has an opening 44 centered on the axis 42 and lip 46 surrounding opening 44. A purpose of top end 38 is to contain liquids in vessel 10 during rotation. Opening 44 may be circular and define an opening diameter. Opening radius may be selected so that fluid remains within vessel 10 at the maximum operating rotation speed. In some embodiments, the maximum operating speed generates a centrifugal force of about 400×g and the opening radius is about 0.25 inches. The diameter of the opening 44 can be large enough to allow the introduction of sample and the removal of fluid, and small enough to keep the fluid from escaping at maximum spin speed. In some embodiments, the diameter of opening 44 may be between about 0.157 inches and about 0.25 inches.

A benefit of lip 46 surrounding opening 44 is that lip 46 retains the liquid contents while vessel 10 spins and permits access to non-spinning devices such as the conduit 18 or pipettor 16. In other embodiments, surface tension and gravity may retain the contents of vessel 10 while spinning and lip 46 may be absent.

Conduit 18 includes one or more tubes 64, a tip 66, and associated fluidics. A purpose of conduit 18 is to deliver and remove liquids to vessel 10. Tube 64 has a free end at tip 66 and a coupled end connected outside of vessel 10 to associated fluidic components such as a bidirectional pump 68, one or more valves 74, one or more wash liquid reservoirs 70, and a waste reservoir 72. The external fluidic components are configured to deliver one or more wash liquids and to remove waste liquids through tube 64 under programmable control. This bidirectional liquid transfer may be driven by bidirectional pump 68, which may be a single pump (such as a syringe pump or peristaltic pump) or may be two or more pumps that each may operate in a single direction. In some embodiments, conduit 18 may be plumbed through housing 14.

Tube 64 enters vessel 10 through opening 44 and extends downwards into lower portion 32. Tube 64 may be a circular tube such as a section of hypodermic needle stock. Tube 64 may be straight over most of its length but may include a bend near its free end so that tip 66 may be positioned near the tapered portion of wall 28. The straight portion of tube 64 may be disposed generally parallel to axis 42 but displaced off-axis (e.g., not co-linear, but parallel) toward one side of annular lip 46. In some embodiments, conduit 18 (including tube 64) does not rotate with vessel 10, so tube 64 is positioned so as not to contact any portion of vessel 10. The off-axis position of tube 64 allows entry of (the generally larger diameter) pipettor 16 without contacting either tube 64 or vessel 10. A benefit of tube 64 extending from above vessel 10 is that fluids can be added or removed from outside vessel 10. A benefit of tube 64 extending through opening 44 is that liquid may be added or removed without rotating seals, reducing system complexity. A benefit of tube 64 terminating adjacent the inner wall is that this maximizes the fraction of liquid removable during wash, increasing wash efficacy. It also removes the liquid at a lower g-force than that applied to particles in the pocket, simplifying the associated fluidics. Benefits of tube 64 terminating below pocket 34 include the benefit that added liquid scrubs through the cells in pocket 34 and that no contained cells are removed as liquid is withdrawn. This increases wash efficacy and improves recovery.

The shape and position of tube 64 as it extends through the upper portions of vessel 10 has unexpected effects. For example, tube 64 stabilizes liquid within vessel 10 during rotation and affects the shape of pulses of wash liquid. With tube 64 configured as described above, vessel 10 can accommodate fluid volumes at rotation rates that otherwise would be expected to overflow vessel 10 through opening 44. Tube 64 sculpts the shape of pulses of added wash liquid as they propagate through vessel 10 producing a more efficacious wash. Without intent to be bound by theory, it is believed that the first effect is due to surface interactions between tube 64 and the parabolic edge of the fluid-free boundary during rotation, and the second effect is due to a combination of surface tension and viscous drag effects. Cell washer 1 takes advantage of these effects to manipulate the fill level and the rotation rate of vessel 10 so as to send pulses of wash fluid upwards and downwards through cells sedimented in pocket 34.

The bend near tip 66 permits tube 64 to remain in its vertical off-axis position over most of its length, while permitting positioning of tip 66 in a desired location further away from axis 42. The bend may position tip 66 to within less than about 0.06 inches from wall 28 to aspirate and deliver liquids during processing. The bend may form any suitable angle including 90, 120, 130, etc. degrees. This relatively large distance reduces tolerances in the manufacture of cell washer 1. In embodiments, tip 66 may be within less than about 0.03 inches from wall 28 to allow conduit 18 to aspirate a larger fraction of liquid remaining after a wash phase and thereby increase wash efficacy. The section of wall 28 proximate tip 66 may be within the tapered portion of lower portion 32. This position permits addition of liquid during rotation that displaces sample components upwards into pocket 34 and removal of liquids with disturbing cells sedimented in pocket 34.

Rotor 12 spins vessel 10 about axis 42. Rotor 12 includes motor 48, and coupling 52. The purpose of rotor 12 is to develop controlled centrifugal force in vessel 10. Motor 48 may be any of a variety of motors known in the art, such as a brushless DC motor. In some embodiments, motor 48 is capable of spinning vessel 10 at a speed of at least about 10000 rotations per minute to develop a radial force of about 400×g or more. Appropriate bearings support the spinning parts.

Motor 48 is electrically connected to controller 20. Controller 20 provides electrical signals as required to motor 48 through a driver (not shown). Coupling 52 connects motor 48 to vessel 10. Coupling 52 may be integrally formed with vessel 10, such as a hole in the outside of bottom 36 formed to accommodate a keyed or pinned shaft of motor 48. Alternatively, coupling 52 may include a hollow that accommodates the outside of vessel 10. In such embodiments, coupling 52 may include windows to afford a view of the process during operation.

Although a rotor 12 is shown for purposes of illustration, any other suitable actuating device may be used. For example, instead of a rotor, the vessel 10 could have magnets within it, which may be electromagnetically coupled to coils in a surrounding container such that the coils and a corresponding electrical source may cause the vessel 10 to move by electromotive force.

Pipettor 16 includes probe 54, elevator 56, and sample pump 58. A purpose of pipettor 16 is to add samples to be washed and to remove washed cells from vessel 10. Pipettor 16 may also remove rinse fluid after vessel cleaning.

Probe 54 can be an elongated tube that enters through opening 44 while rotation is stopped. The purpose of probe 54 is to contain and deliver liquids to and from vessel 10. Probe 54 may be a washable tube such as those commonly employed in chemistry or hematology analyzers. Alternatively, probe 54 may be a disposable pipette tip coupled to a pipettor mandrel. Probe 54 may also include conventional level sensing devices, such as a capacitive level sensor, to detect the level of fluids within sample containers and in vessel 10.

Probe 54 approaches vessel 10 at or near the bottom center to assure maximal removal of material. Probe 54 enters vessel 10 closer to the vessel axis than tube 64 is disposed to avoid collisions. The benefits of using a probe separate from conduit 18 to add and remove liquid is that probe 54 can pipette sample, reducing carryover compared to the more complex fluidic connections of conduit 18, and that the probe can approach the bottom of the vessel without risk of disturbing the position of tip 66.

Elevator 56 may be constructed of conventional positioning components including motors and slides. Its purpose is to raise and lower probe 54 through opening 44 to deliver or remove liquids. Elevator 56 may also include at least one additional axis of motion to position probe 54 with respect to sample containers, waste receptacles, probe washers, or liquid reservoirs. Sample pump 58 is fluidically coupled to probe 54 and supplies motive force to move fluids within probe 54. Sample pump 58 may be any of a variety of conventional pumps capable of delivering controlled volumes of sample, such as a syringe pump or a piston pump.

In other embodiments, conduit 18 may perform some or all of the functions of pipettor 16. In such embodiments, conduit 18 may further include a conduit transport (not shown) that positions tube 64 with respect to vessel 10. The conduit transport may be constructed of conventional positioning components including motors and slides.

Some embodiments of cell washer 1 may also include a housing 14. Housing 14 surrounds vessel 10 and may also surround portions of rotor 12, and conduit 18 as illustrated in FIG. 1A. A purpose of housing 14 is to contain any leaked or aerosolized materials resulting from the wash process. Housing 14 may couple fluidically to conduit 18 so that conduit 18 is plumbed to bidirectional pump 68 through a portion of housing 14. Housing 14 may also include a hole aligned with the axis of vessel 10 to allow entry of probe 54. In some embodiments housing 14 also includes a vacuum port attachable to a suction pump to remove aerosolized material.

Controller 20 may be a conventional controller such as a microcomputer, microprocessor, programmable logic controller, or similar device capable of flexibly sequencing operations of the rotor, elevator, and fluidics to perform one of a variety of cell washing protocols. In operation, a user may select a stored protocol or may compile steps for a new protocol that controller 20 will subsequently execute. Controller 20 typically controls mechanical devices such as elevator 56, rotor 12, bidirectional pump 68, sample pump 58, and other components by generating low level signals. Drivers (not shown) may translate the low level signals to drive signals appropriate to each mechanical device. In some embodiments, controller 20 may also receive signals from devices reporting the status of cell washer 1. Such devices may include tachometers or encoders for rotation feedback, level sensors for pipettor or conduit feedback, and video signals for separation progress feedback, among others.

In some embodiments, the controller 20 may be embodied by a processor and a computer readable medium coupled to the processor. The computer readable medium may comprise code, executable by the processor, for implementing any of the functions described herein.

Cell Wash and Vessel Cleaning

The sample may include whole blood treated with red cell lysing agent, or any other cellular sample where a wash is desired. Wash liquids may be isotonic buffers, which may in some embodiments include added materials to reduce intercellular effects. We have found that addition of about 5 mM EDTA to the wash liquid or resuspension buffer (PBS with fetal calf serum or BSA of density about 1.0015 g/mL or about 0.1% to about 2% concentration) prevents formation of an indeterminate cell population (possibly degranulated granulocytes) that appear adjacent populations of monocytes and granulocytes in white blood cell samples.

A protocol may use different wash liquids during different portions of the wash process. A protocol may also use a resuspension buffer that is different from wash liquids in the final resuspension step. The controller may select the desired added liquids according to a protocol by switching appropriate ones of valves 74 to connect a reservoir 70 containing the desired liquid to bidirectional pump 68 in a manner familiar to those skilled in the art of fluid handling.

All steps described are controlled by the controller. The controller receives its instructions from a software program stored in its program memory. The controller (or a second computer operating as a user interface) accepts user instruction and (transmits the instructions to the controller, which) sequences the various mechanical components according to the selected protocol.

Figure 3D:
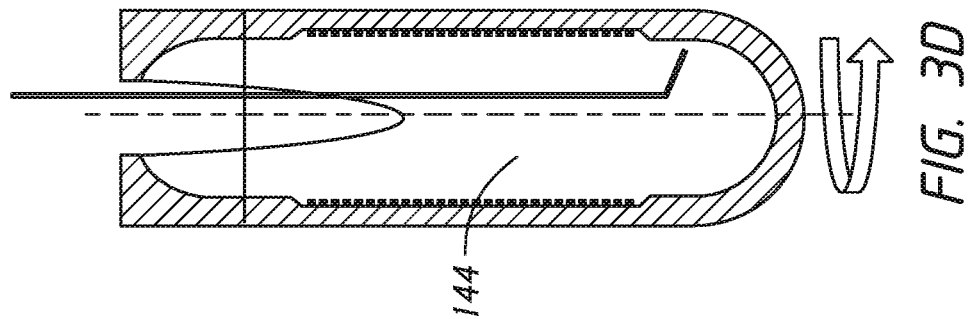
FIGS. 3A-3F show diagrammatic steps of an exemplary cell washing protocol.
Figure 3C:
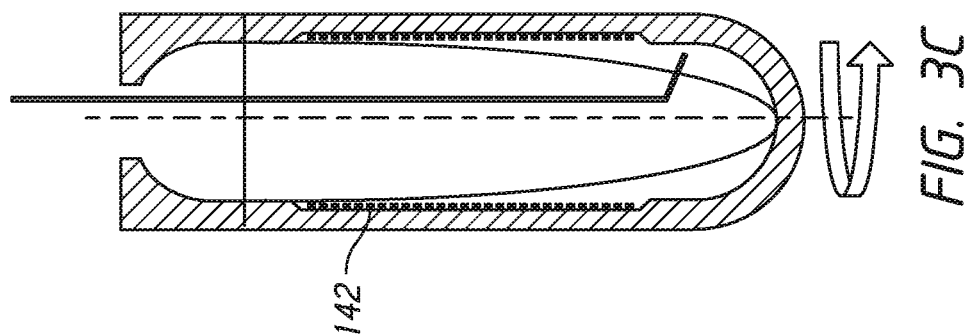
Figure 3B:
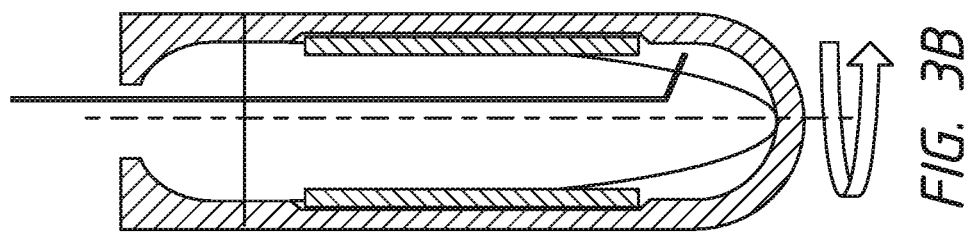
Figure 3A:
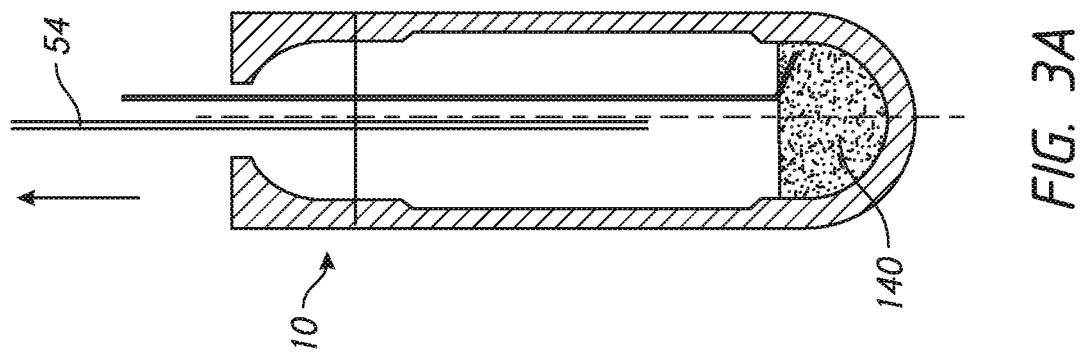
Figure 3E:
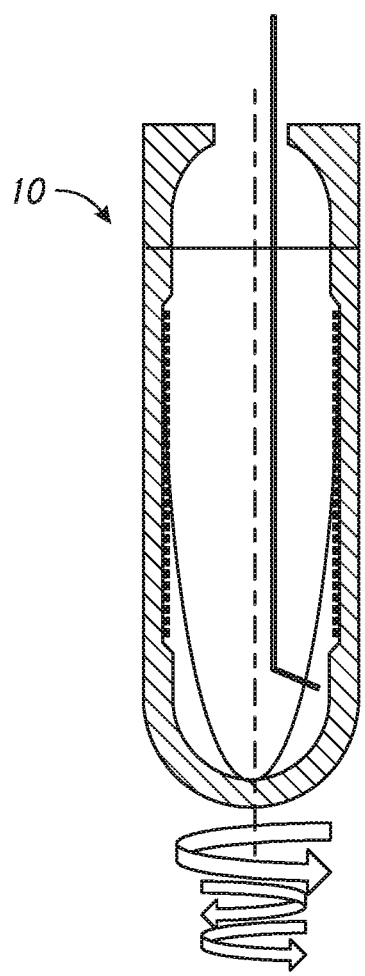
Figure 3F:
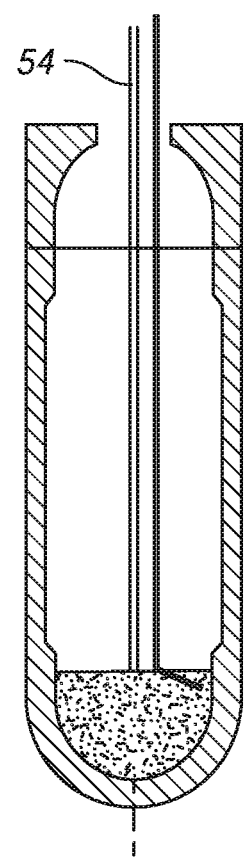
Figure 4:
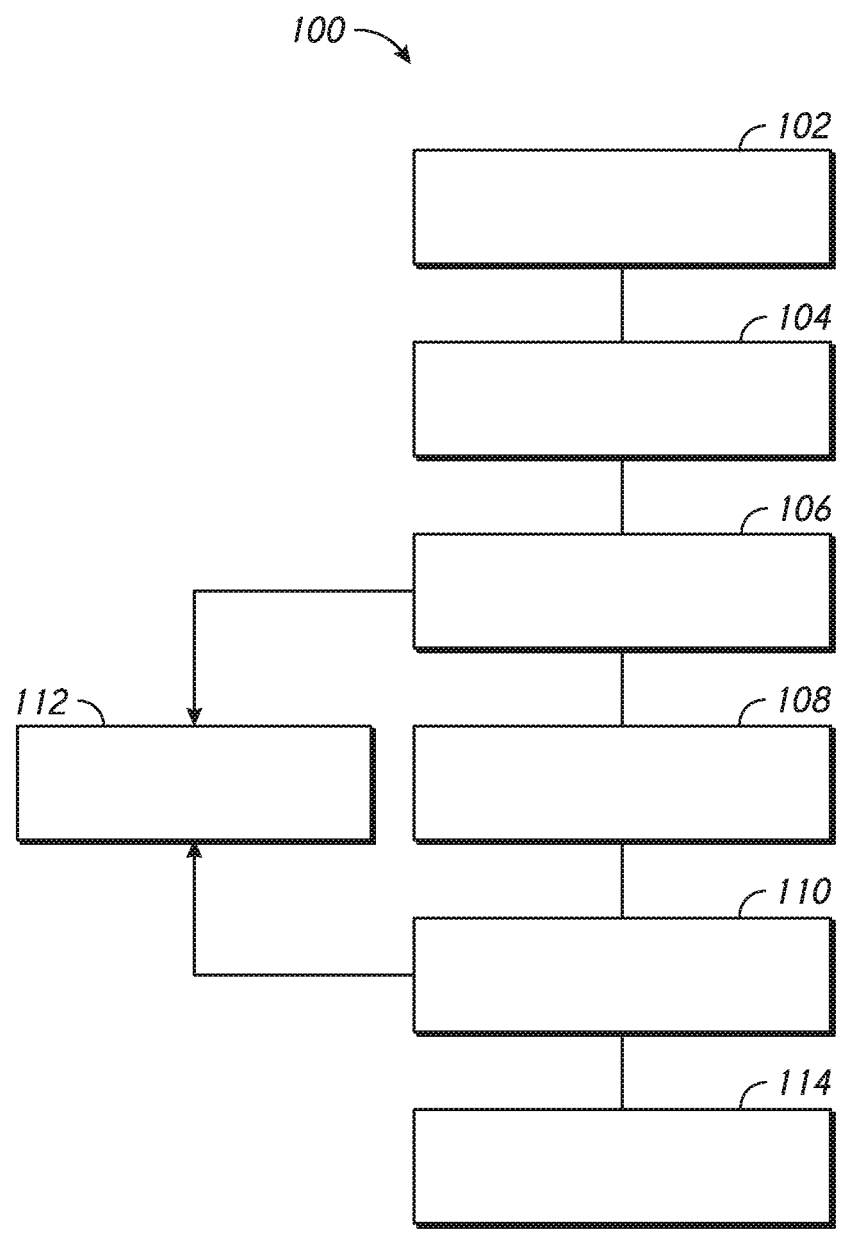
FIG. 4 shows a flow chart of the cell washing protocol of FIGS. 3A-3F.

An exemplary cell washing process is illustrated diagrammatically in FIGS. 3A-3F and in the flow chart of FIG. 4. In general, a method according to an embodiment of the invention may include a method of washing cells from a sample including cells suspended in a liquid, the method comprising: dispensing the sample into a vessel including a body defining a cavity and a pocket, the pocket extending radially outward relative to an inner wall surface defining the cavity; rotating the vessel about the axis at a first speed, displacing the cells into the pocket; sedimenting the cells within the pocket; and withdrawing at least part of the liquid.

In step 102 and as illustrated in FIG. 3A, probe 54 dispenses a sample 140 into vessel 10. The vessel 10 may include the same or different features as described above. Then, probe 54 aspirates an aliquot of sample 140, descends into vessel 10, and deposits the aliquot of sample 140 at or near the bottom of the vessel 10. Elevator 56 then withdraws probe 54. FIG. 3A shows the position of sample 140 in vessel 10 after the transfer is completed.

In step 104 and as illustrated in FIG. 3B, the controller rotates (e.g., spins) vessel 10 at a first speed sufficient to produce at least about 100 or 250 g at the inner wall of pocket 34. Once spinning, conduit 18 dispenses a wash liquid 144 at a high rate (about 1 mL per second). The volume is sufficient to displace the some or the entirety of the initial sample 140 into pocket 34. In some embodiments, the high injection rate along wall 28 provides inertia to displace sample 140 rather than completely mix with it. In this and other steps involving liquid addition by conduit 18, controller 20 sequences operations of bidirectional pump 68 and any appropriate valve 74 to direct liquid from reservoir 70 through tube 64 and out tip 66.

In step 106 and as illustrated in FIG. 3C, spin continues at the first speed for about five seconds to sediment cells 142 to the inner wall surface portion 37A of pocket 34. Then controller 20 reduces spin speed to a lower wash speed.

In step 108 and as illustrated in FIG. 3D, conduit 18 injects additional wash fluid 144 at a lower flow rate (about 200 μL per second) to fill vessel 10 (bring the edge of the fluid-free margin to about the radius of circular opening 44 at top end 38. Shear force pulses, generated by interaction of tube 64 with the liquid and the fluid air boundary during fluid injection, helps scrub cells 142 confined against the wall of pocket 34. The added wash fluid 144 moves through the cells vertically, so that the direction of wash fluid flow is substantially perpendicular to the direction of centrifugal force holding cells 142 in pocket 34. A benefit of this perpendicular flow is that it reduces unswept volumes among the cells 142. The shear force pulses may be modulated by altering the rotation rate and fluid injection speed. In some embodiments controller 20 varies the rotation rate to move the fluid-free margin up or down through the pocket to scrub the cells retained therein.

In step 114 and as illustrated in FIG. 3E, conduit 18 aspirates liquid at a high rate, ramping down the rotation rate while aspirating to thicken the layer of liquid near tip 66. In this and other steps involving liquid removal by conduit 18, controller 20 sequences operations of bidirectional pump 68 and any appropriate valve 74 to direct liquid into tip 66, through tube 64, and to waste 72. Minimum spin rate produces a force of about 25×g on cells 142 to retain cells 142 in pocket 34. Conduit 18 then adds wash liquid so that the total volume approximates the initial sample volume. Controller 20 transiently stops or reverses rotation to resuspend the cells from pocket 34. Reversal may include two changes of direction (the second restores the original direction of rotation). These changes in rotation take place in a relatively short time-less than about one second. Such rapid changes produce high tangential accelerations that act as inertial forces on the contents of vessel 10. The inertial forces increase with radius so that the cells sedimented in pocket 34 experience the highest inertial forces. These inertial forces, in conjunction with viscous and buoyant effects in the liquid, serve to agitate the cells and intermix them with adjacent portions of the liquid.

In step 112, controller 20 repeats steps 106 through 110 a number of times. More cycles result in greater wash efficacy. In some embodiments, controller 20 sequences two or three repetitions of steps 106 through 110. During the final wash the amount of liquid added is adjusted to suspend the particles at the desired concentration for cytometry or other subsequent processing. The volume of added liquid may be less than the original volume of the sample.

In step 110 and as illustrated in FIG. 3F, rotation stops, and probe 54 descends to near the bottom of vessel 10 and aspirates the washed sample for analysis or further processing elsewhere. The system then cleans vessel 10 to prepare for the next use.

Figure 5D:
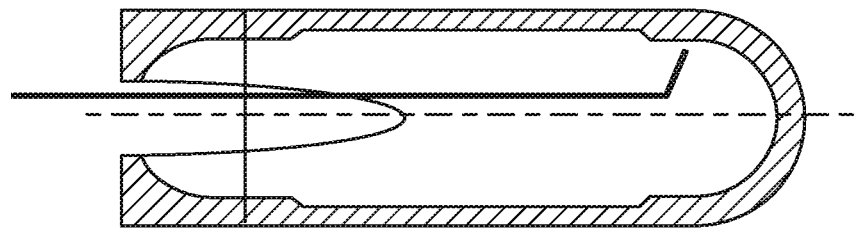
FIGS. 5A-5f show diagrammatic steps of an exemplary vessel cleaning protocol.
Figure 5C:
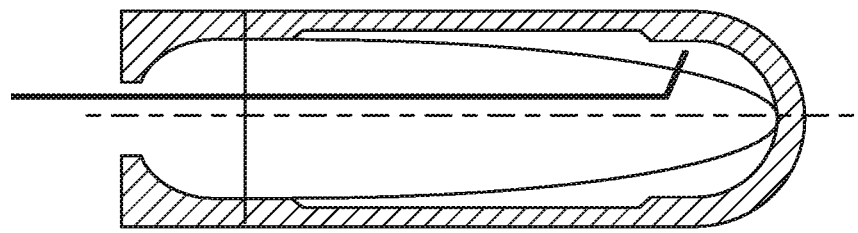
Figure 5B:
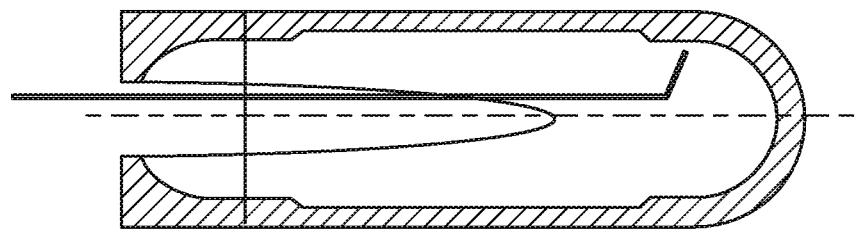
Figure 5A:
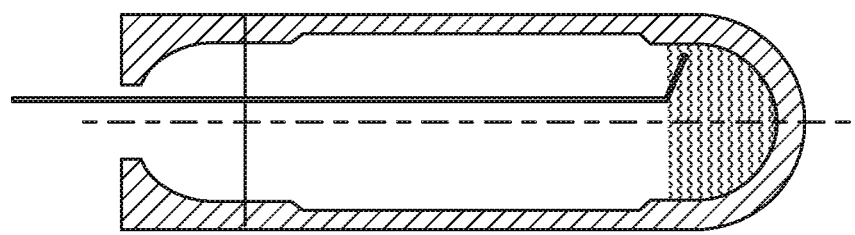
Figure 5E:
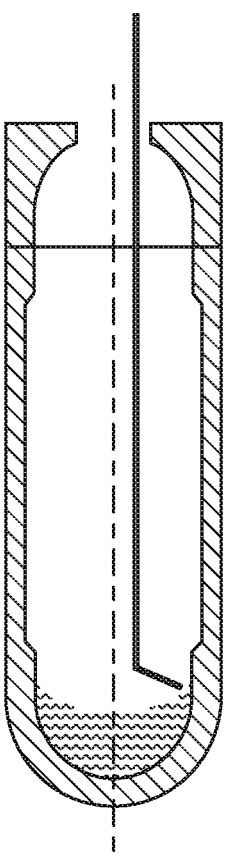
Figure 5F:
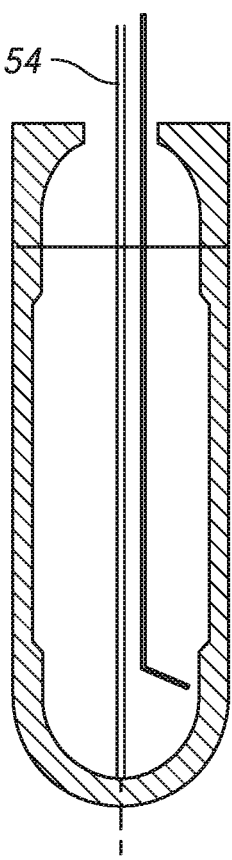
Figure 6:
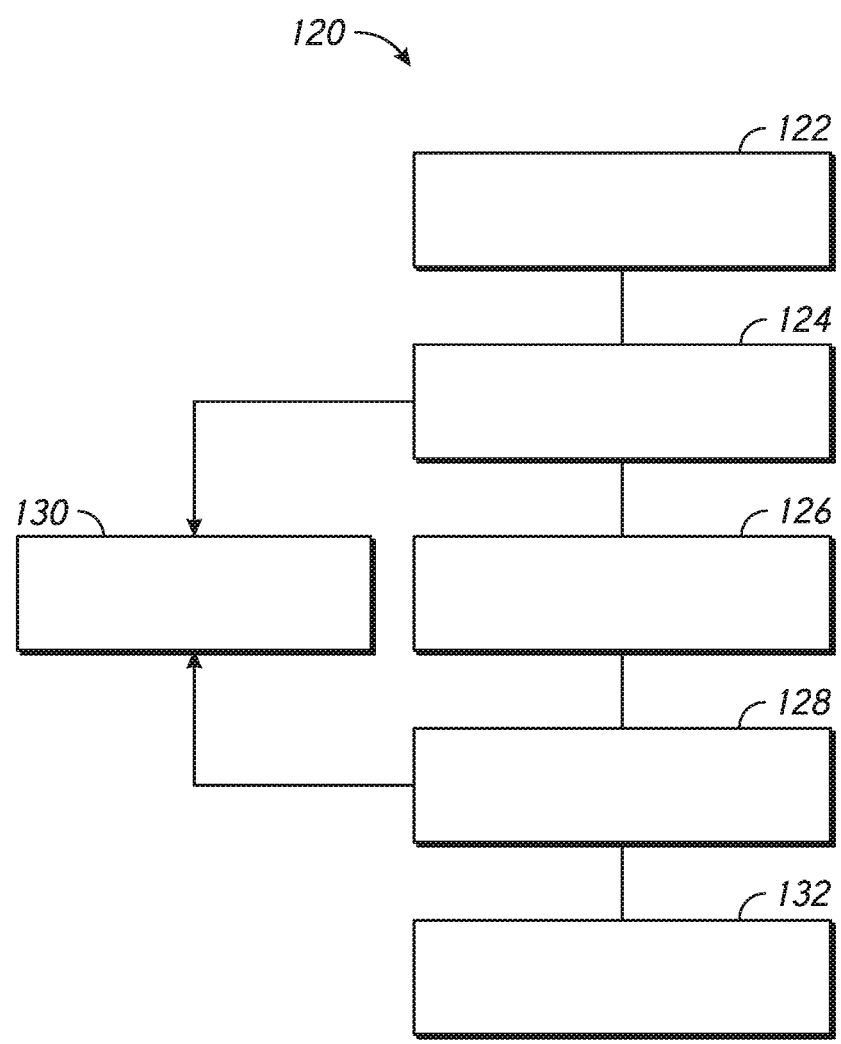
FIG. 6 shows a flow chart of the vessel cleaning protocol of FIGS. 5A-5f.

An exemplary vessel cleaning process 120 is illustrated diagrammatically in FIGS. 5A-5F and in the flow chart of FIG. 6.

In step 122 and as illustrated in FIG. 5A, conduit 18 adds rinse liquid rapidly without spinning vessel 10.

At step 124, vessel 10 spins, then conduit 18 aspirates rinse liquid during the spin. Controller 20 varies the spin speed to move the parabolic fluid-free margin up and down through vessel 10 as illustrated in FIGS. 5B-5D.

At step 126 and as illustrated in FIG. 5E, conduit 18 aspirates all remaining accessible fluid as rotation slows.

At step 128, controller 20 adds rinse liquid thorough conduit 18 and repeats steps 124 through 126 one or more times. In some embodiments, the controller sequences two or three repetitions of steps 124 through 126. More cycles result in improved vessel cleanliness and reduced carryover.

At step 130 and as illustrated in FIG. 5f), probe 54 descends to bottom of vessel 10 and aspirates all remaining accessible liquid. Vessel 10 is then ready for reuse.

Example 1: Experimental Wash

Each of Examples 3-10 use the vessel and protocol embodiments below:

Vessel 10 is about 2 inches tall and has upper and lower portions each about 0.4 inches tall and a pocket about 1 inch tall (the axial extent or height). Upper and lower portions have cylindrical sections with inside diameter of about 0.3125 inches; the pocket has inside diameter of about 0.4125 inches. Thus, in this embodiment, the pocket forms a cylindrical shell with depth of about 0.05 inches and maximum radius of about 0.206 inches. The shell depth is about one eighth of the shell outer diameter. The shell depth is about one twentieth of the axial extent of the pocket. The diameter of the central hole is about 0.157 inches. The inside walls of the upper and lower portions taper away from the pocket by terminating in hemispherical sections.

The example protocol includes the following steps, as modified where noted by experimental variations:
a) using probe, add 100 µL whole blood mixed with 400 µL red cell lysing agent and labels as required by each experiment;
b) spin at 6460 rpm (to produce about 100 or 250×g at pocket wall);
c) using conduit, add 500 µL wash liquid at 1 mL/sec;
d) sediment cells to pocket wall for 5 sec;
e) using conduit, add 2 mL wash liquid at 200 µL/sec;
f) using conduit, remove 2.4 mL liquid at 1 mL/sec while decreasing spin speed linearly to 2000 rpm (to produce about 25×g at pocket wall);
g) using conduit, add 400 µL wash liquid and reverse rotor twice for 0.5 seconds to resuspend cells;
h) repeat steps e), f), and g) for number of times as required by each experiment. After last repeat of step f), replace wash liquid in step g) with resuspension buffer and stop rotation; and
i) using probe, aspirate washed cells and analyze in a flow cytometer.

Example 2: Traditional Wash a) manually load 100 µL whole blood mixed with 400 µL red cell lysing agent and labels as required by each experiment into 12×75 mm polypropylene tubes;
b) add 2 mL wash liquid; mix by inversion;
c) spin 500×g for 5 min to pellet cells;
d) aspirate supernatant by pipette;
e) repeat steps b) through d) twice; and
f) resuspend pellet in 400 µL resuspension buffer and mix by inversion.

Example 3: Biological Equivalency-Scatter

FIG. 7 compares scatter plots of white blood cell recovery using embodiments of the device and method of the invention compared to traditional wash and to no wash. Upper row plots forward scatter (FS) against side scatter (SS) for unwashed cells, traditionally washed cells, and cells washed according to Example 1 (test method). Lower row plots CD45 (labeled with Krome Orange) against SS. Krome Orange is a trademark of Beckman Coulter, Inc. Light scatter and representation of WBC populations using test method are comparable to traditionally washed and to unwashed cells.

Example 4: Biological Equivalency—Five-Part Differential

Figures 8A, 8B, 8C:
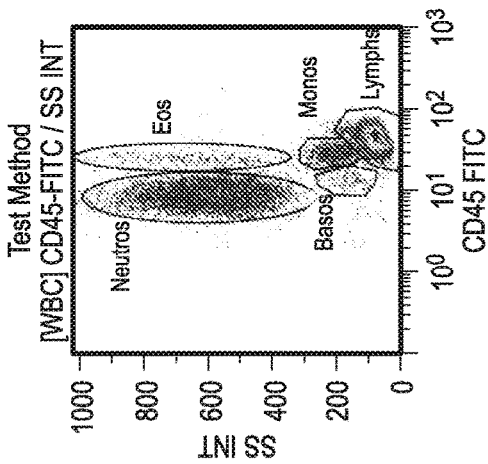
FIG. 8 shows scatter plots for a five-part differential WBC analysis using embodiments of the device and method of the invention compared to traditional wash and to no wash.
Figures 8D, 8E, 8F:
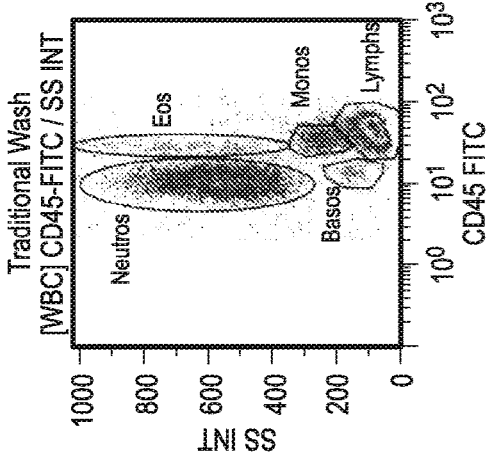

FIG. 8 compares scatter plots of white blood cell recovery using the test method compared to traditional wash and to no wash. Upper row plots CD45 (labeled with FITC) against SS for unwashed cells, traditionally washed cells, and cells washed according to test method. Lower row plots CD14 (labeled with PE-Cy7) against SS. Calculated values below each set of plots shows recoveries for neutrophils, monocytes, lymphocytes, eosinophils, and basophils is comparable to traditional cell wash and to no wash.

Example 5: Biological Equivalency-Platelets

Figures 9A, 9B, 9C:
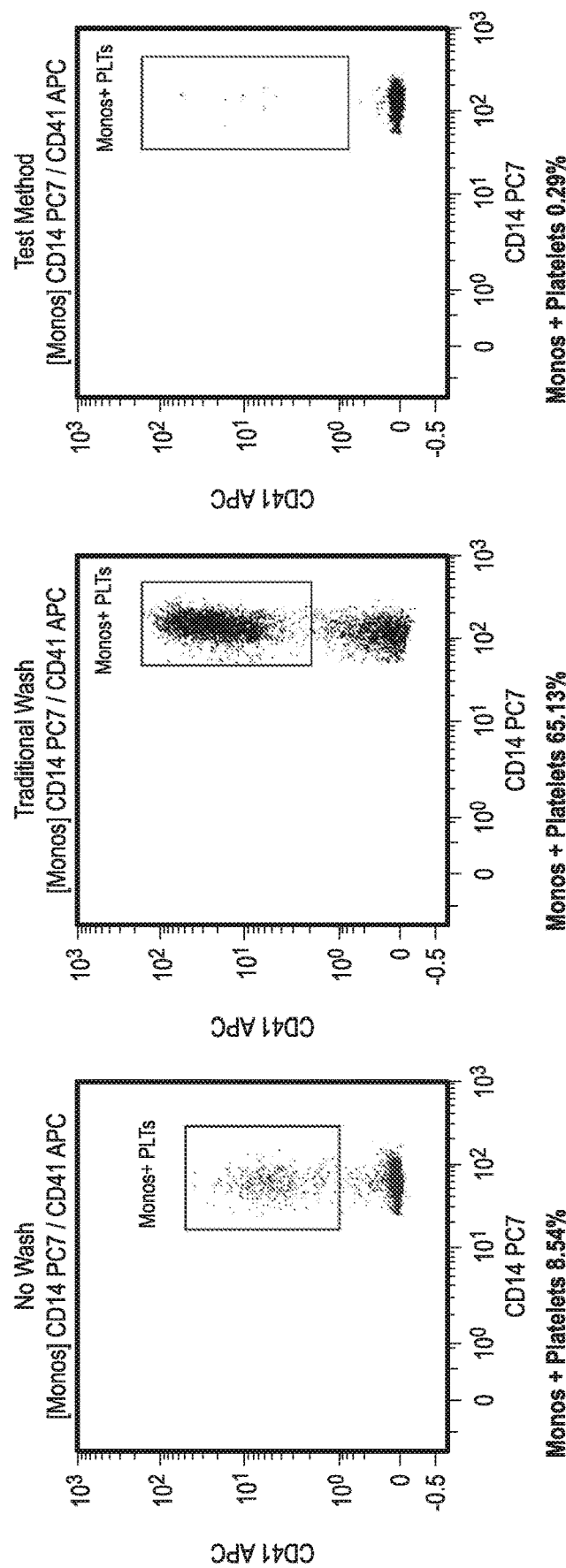
FIG. 9 shows scatter plots of platelet monocyte interactions using embodiments of the device and method of the invention compared to traditional wash and to no wash.

FIG. 9 compares scatter plots of CD14 (labeled with PE-Cy7) against CD41 (a platelet marker here labeled with APC) using the test method compared to traditional wash and to no wash. Plots were gated on the rectangular region marked Monos in the lower plots of FIG. 8. Note the considerable reduction in density of monocytes showing CD41 binding, especially as compared to the traditional cell wash method. Test method included 5 mM EDTA in wash buffer. Platelets attachment to monocytes is significantly decreased for the test method.

Example 6: Biological Equivalency—Viability

FIG. 10 compares scatter plots of analysis of white blood cell viability using the test method compared to traditional wash and to no wash. The plots display signal from 7-Aminoactinomycin D (7AAD) against SS. 7AAD binds to dead cells but not live cells. Calculated cell viability shows insignificant decreases compared to traditional cell wash and is acceptable for flow cytometry analysis.

Example 7: Biological Equivalency: Kappa/Lambda Separation

Figure 11B:
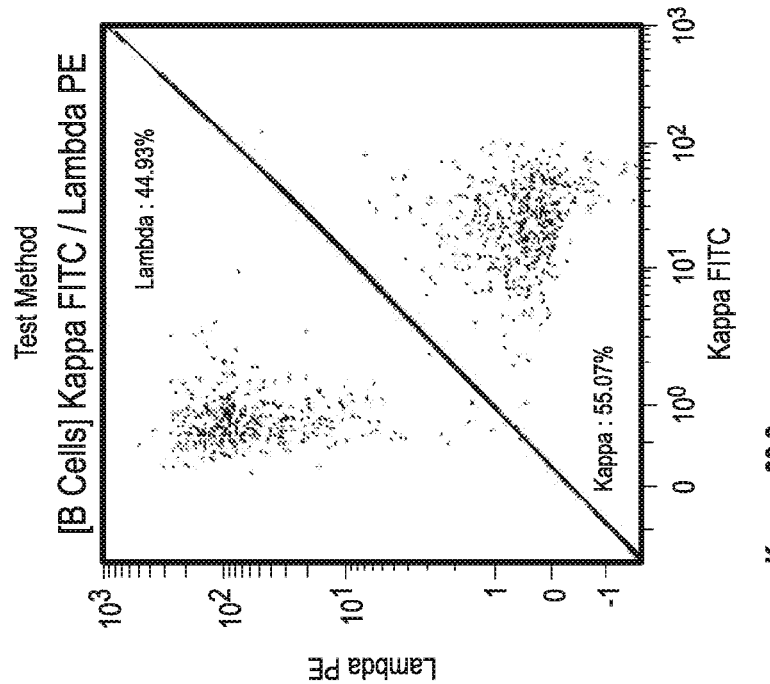
FIG. 11 shows Kappa/Lambda separation using embodiments of the device and method of the invention compared to traditional wash.
Figure 11A:
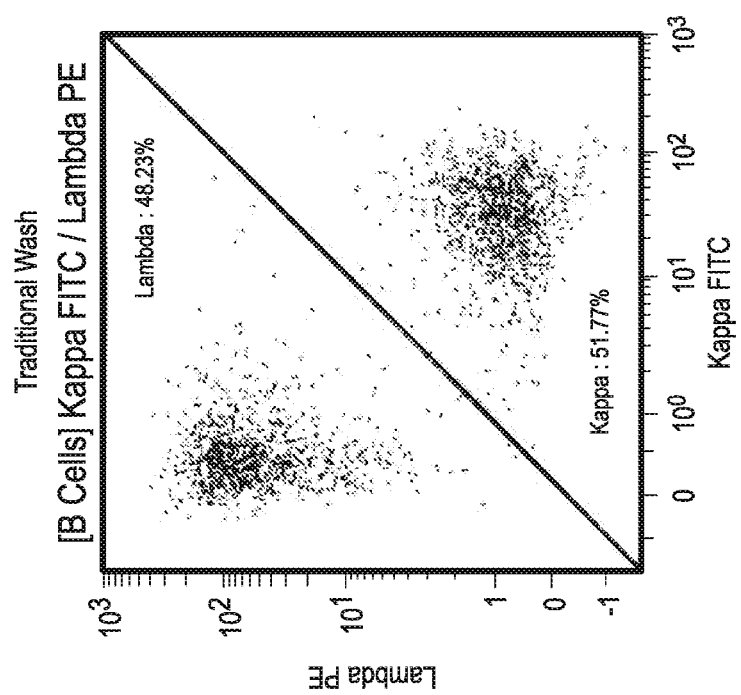

FIG. 11 compares scatter plots of B cells displaying lambda (labeled with PE) against kappa (labeled with FITC). The diagonal lines separate kappa positive B cells from lambda positive B cells using the test method compared to traditional wash. The calculated values are signal separation expressed as signal to noise ratios. These are calculated as Kappa=KX-median/LX-median and Lambda=LY-median/KY-median. Gated values for Kappa and Lambda are comparable to traditional wash.

Example 8: Biological Equivalency: Total Cell Recovery

Figures 12A, 12B, 12C:
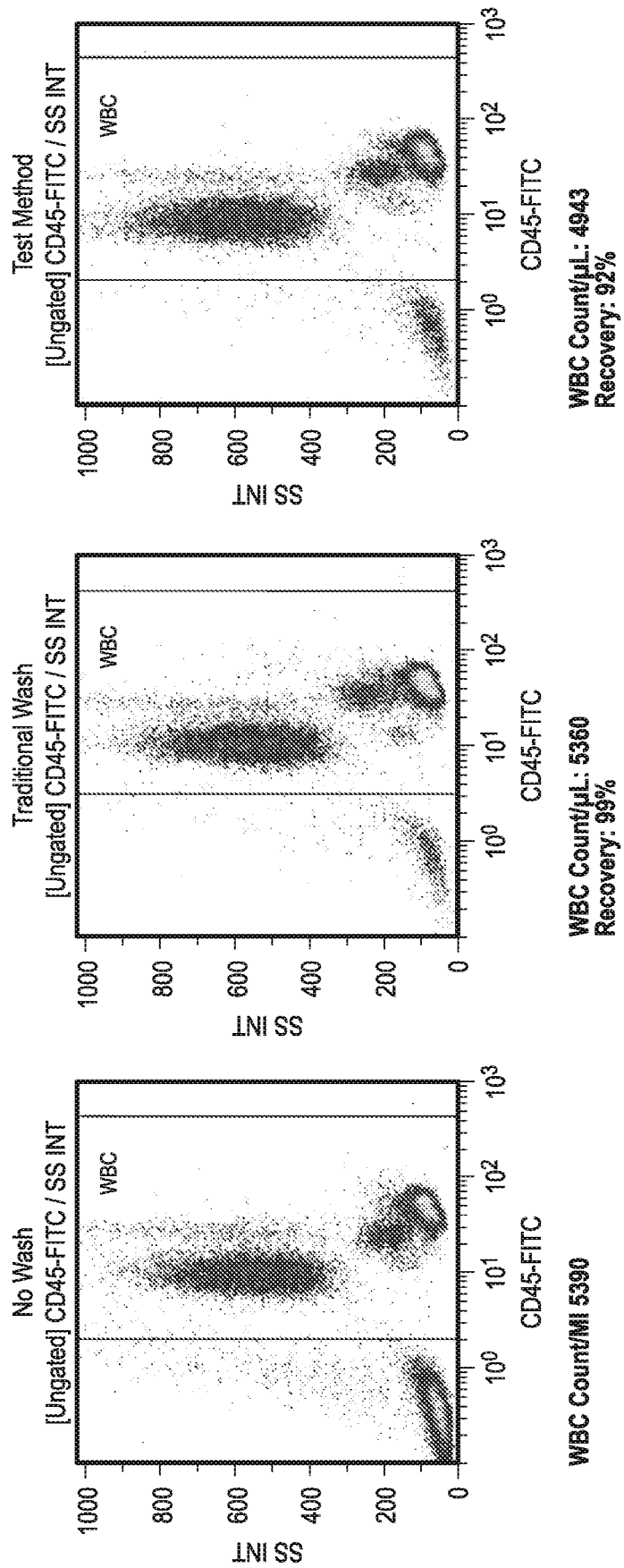
FIG. 12 shows total cell recovery using embodiments of the device and method of the invention compared to traditional wash.

FIG. 12 compares scatter plots of ungated white blood cells for analysis of total cell recovery using the test method compared to traditional wash and to no wash. The plots display signal from CD45 (labeled with FITC) against SS as in Example 4. The calculated values are cells recovered compared to the no wash case.

Example 9: Biological Equivalency: Cell Subset Recovery I

Figure 13C:
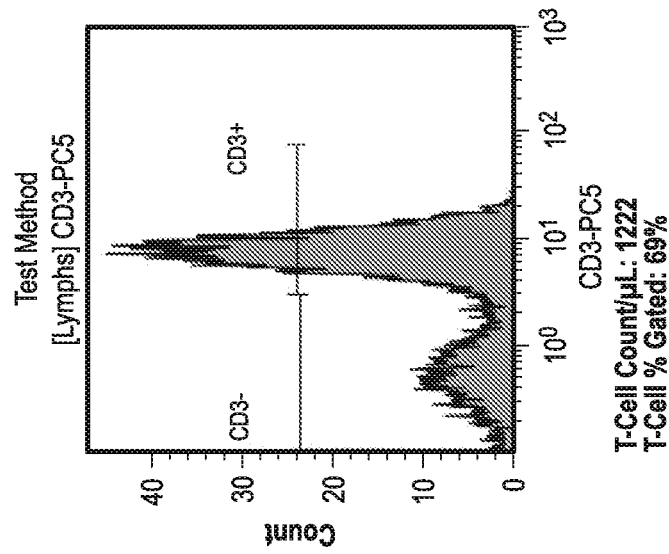
FIG. 13 shows lymphocyte T-cell recovery using embodiments of the device and method of the invention compared to traditional wash and to no wash.
Figure 13B:
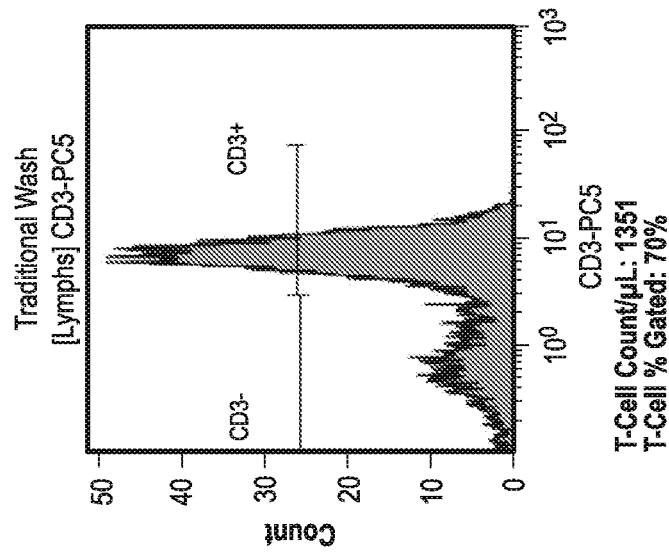
Figure 13A:
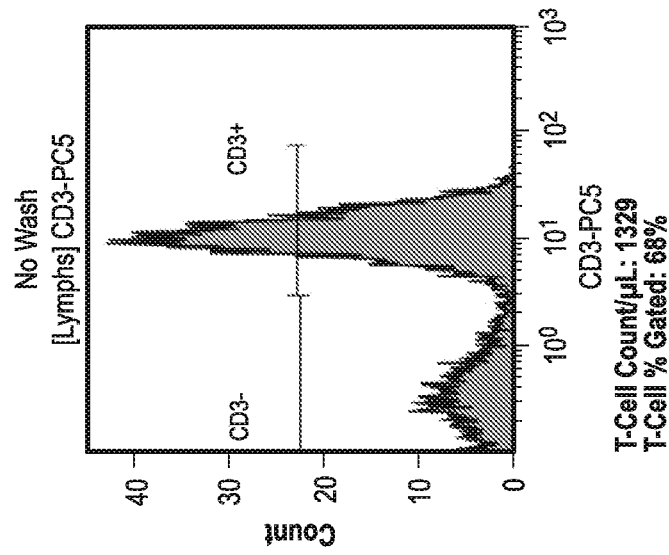

FIG. 13 compares histograms of T-cell subset recovery using the test method compared to traditional wash and to no wash. The histograms display bins of CD3 signal (labeled with PE-Cy5). Subset cell recovery for the test method (gated from WBCs labeled with Beckman Coulter, Inc. Tetra Panel) is comparable to traditional and no wash.

Example 9: Biological Equivalency: Cell Subset Recovery II

FIG. 14 compares scatter plots of B cells and NK cell recovery using the test method compared to traditional wash and to no wash. The plots display signal from CD56 (labeled with Rhodamine) against CD19 (labeled with ECD) (gated from WBCs labeled with Beckman Coulter, Inc. Tetra Panel). B-cell and NK cell recovery for the test method is comparable to traditional and no wash.

Figure 16:
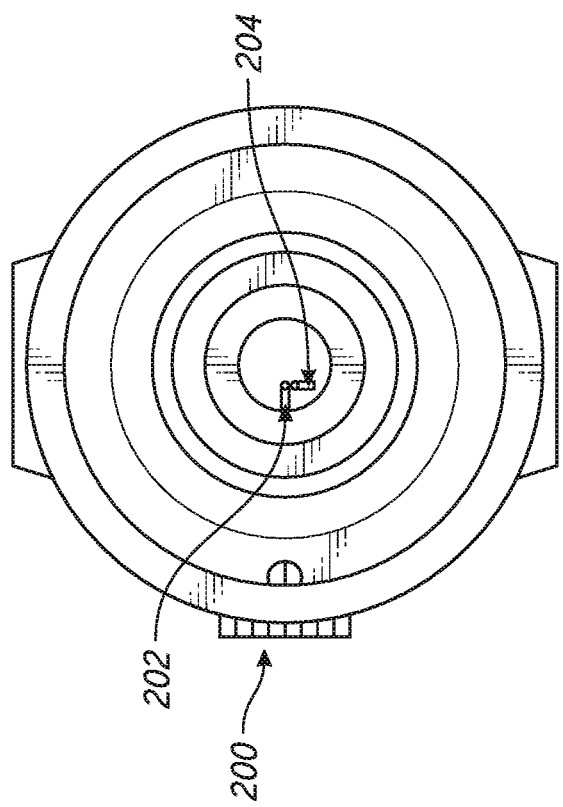
FIG. 16 shows a top cross-sectional view of the assembly shown in FIG. 15.
Figure 15:
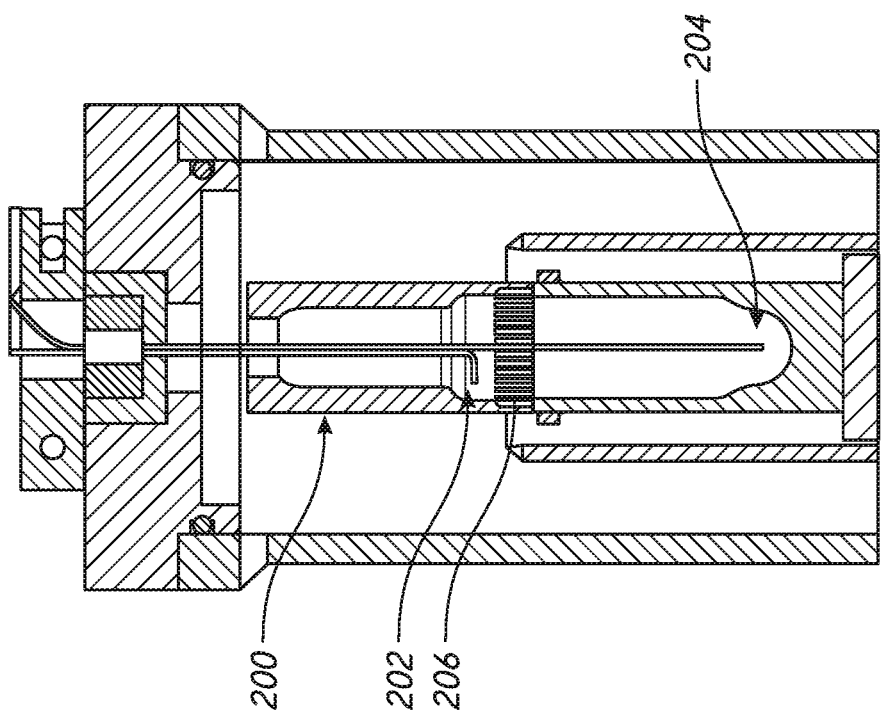
FIG. 15 shows a partial side cross-sectional view of an assembly according to an embodiment of the invention.

FIGS. 15 and 16 show an embodiment that includes two probes, a dispense probe and an aspiration probe. There are several benefits to having two conduits such as two probes. If a single probe is used, then one probe has to dispense clean buffer and remove waste. Therefore, one benefit of using a system with two probes is to minimize contamination between adjacent runs. In other words, clean buffer can be contaminated from the previous run's waste. A second benefit, is that the two probes can be placed at different locations. The dispense probe (which can dispense clean buffer) can be located at the top of a vessel while the removal probe (which can dispense waste) is located at the bottom of the vessel. At the end of the run, a small amount of buffer is dispensed out of the upper probe to clean the inner walls as the buffer falls to the bottom of the vessel. This helps with recovery of the blood cells during a blood purification process.

FIG. 15 shows a partial side cross-sectional view of an assembly according to an embodiment of the invention. FIG. 15 shows a vessel 200, which can have the configuration of the previously described vessel embodiments. A dispense probe 202 and an aspiration probe 204 and their distal ends are disposed within the vessel 200. The aspiration probe 204 is linear and extends towards a bottom of the vessel 200, and can be configured to remove waste buffer. The dispense probe 202 has at its end a 90 degree bend to add wash buffer to the pocket 206 and any material that might be in the pocket 206. The aspiration probe 204 may also have a 90 degree bend at its distal end, or it could be linear. The bend is more clearly illustrated in FIG. 16. An end of the aspiration probe 204 can be just below the pocket 206. Although the ends of the dispense probe 202 and the aspiration probe 204 are shown to be orthogonal to each other in FIGS. 15 and 16, in other embodiments, they may be within the same plane, or possibly aligned in a similar manner.

FIG. 16 shows a top cross-sectional view of the assembly shown in FIG. 15. FIG. 16 shows a top down view of the distal end portions of the dispense probe 202 and the aspiration probe 204. As shown in FIG. 16, the long axes of the dispense probe 202 and the aspiration probe 204 are off center with respect to a center axis of the vessel.

Some exemplary wash routines that can be performed using embodiments of the invention can be described as follows. One wash routine is a "sample wash," where a specimen such as blood (e.g., 100 uL of blood) is washed. The second wash routine can be a "lyse wash," where the non-cellular products of cell lysis are removed from the blood sample. The third routine is a "bulk wash," where larger amounts (e.g., 500 uL) of blood are washed. In some embodiments, a full workflow may include the first wash routine (sample wash) followed by the second wash routine (lyse wash).

Sample Wash (e.g., of a Single 100 uL Specimen)

Step 1. Dispense a specimen (e.g. blood) into a vessel.

Step 2. Dispense a fresh wash buffer into the vessel with a dispense probe located at an upper region of the vessel.

Step 3. Rotate the vessel back-and-forth to cause the specimen to vortex.

Step 4. Spin the vessel at a maximum speed to pellet components of the specimen into the vessel pocket.

Step 5. Remove the waste buffer using the aspiration probe located near the bottom of the vessel as the speed of rotation of the vessel is reduced.

Step 6. Perform steps 2 to 4 a total of four or more times.

Step 7. Spin the vessel back-and-forth in intervals. Each interval is a slower speed than the previous one. This is to dislodge any cells that might be adhered to the walls.

Step 8. Dispense a small amount of buffer into the vessel using the upper probe to clean the vessel walls while the tube spins slowly.

Lyse Wash

Step 1. Transfer the lysed solution with an external pipette into the vessel. The lyse solution may include the specimen and a lysing agent. For example, the lyse solution may include 100 uL of blood and 2.0 mL of IOTest Lyse (an ammonium chloride-based erythrocyte lysing solution available from Beckman Coulter, Inc.). The total volume may be more than 2.0 ml. (e.g., 2.1 mL).

Step 2. Immediately spin the vessel at maximum speed to pellet the blood into the pocket.

Step 3. Remove the lyse supernatant (with the lower aspiration probe) as the rotational speed of the vessel is reduced.

Step 4. Stop the rotation of the vessel.

Step 5. Dispense fresh wash buffer with the upper dispense probe.

Step 6. Spin the vessel back and forth to create a vortex in the specimen.

Step 7. Spin the vessel at maximum speed to pellet components of the specimen into the vessel pocket.

Step 8. Remove the waste buffer using the lower aspiration probe as the rotational speed of the vessel is reduced.

Step 9. Spin the vessel back and forth in intervals. Each interval is at a slower speed than the previous one. This can be used to dislodge any cells that might be adhered to the walls.

Step 10. Dispense a small amount of buffer using the upper dispense probe to clean the vessel walls while the vessel is spins slowly.

Bulk Wash (500 uL of Specimen)

1. Use the Same Procedure as Sample Wash Except the Durations of Each Step are Longer Although aspects of the present specification are highlighted by referring to specific embodiments, these disclosed embodiments are only illustrative of the principles of the subject matter. The invention encompasses any combination of features in described embodiments unless otherwise indicated or clearly contradicted by context.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus twenty percent above and below the value of the stated characteristic, item, quantity, parameter, property, or term. Accordingly, unless indicated to the contrary, the numerical parameters set forth in the specification and attached claims are approximations that may vary.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated or clearly contradicted by context. The use of examples, or exemplary language (e.g., "such as") is intended merely to better illuminate the present invention and not as a limitation on the scope of the invention. No language in the present specification should be construed as indicating any non-claimed element essential to the practice of the invention.

The invention claimed is:

1. A cell washer comprising:
   a vessel configured to hold cells, the vessel comprising an elongated body including an opening, an inner surface, an outer surface, a cavity, and a pocket, the outer surface having a cylindrical profile and terminating in a hemispherical bottom, the pocket defined by a first inner surface portion of the inner surface disposed between and radially outward relative to a second inner surface portion and a third inner surface portion of the inner surface, the first, second, and third inner surface portions having cylindrical profiles, and the elongated body being thinner adjacent to the pocket than adjacent to the second and third inner surface portions;
   an actuating device capable of causing the vessel to rotate about an axis;
   a conduit configured to pass through the opening and configured to transfer fluid to and from the cavity; and
   a controller programmed to control the transfer of fluid to and from the cavity through the conduit while the actuating device causes the vessel to rotate about the axis.

2. The cell washer of claim 1, wherein the cavity is defined by a lower portion of the body and is below the pocket, wherein the pocket has a length to depth 2 or more to 1.

3. The cell washer of claim 2, wherein a transition from the first inner surface portion to the second inner surface portion is a sigmoid-shaped transition.

4. The cell washer of claim 1, wherein the conduit comprises a tip disposed adjacent a wall of the vessel and below the pocket.

5. The cell washer of claim 1, wherein the conduit is parallel to the axis.

6. The cell washer of claim 1, wherein the conduit is in fluid communication with a fluid pump.

7. The cell washer of claim 1, further comprising an upper annular portion disposed between the pocket and the opening.

8. The cell washer of claim 1, further comprising:
   a probe coupled to an elevator, the elevator configured to lower the probe through the opening, the probe being in fluid communication with a pump.

9. The cell washer of claim 1, wherein the controller is coupled to the actuating device to control the rotation of the vessel about the axis.

10. The cell washer of claim 1, further comprising a dispense probe and an aspiration probe passing through the opening and into the vessel.

11. The cell washer of claim 10, wherein each of the dispense probe and the aspiration probe include bent ends.

12. The cell washer of claim 10, wherein the aspiration probe terminates at a lower point within the vessel than the dispense probe.

13. The cell washer of claim 10, wherein the aspiration probe and the dispense probes contain portions that are parallel to the axis, but off center from the axis.

14. The cell washer of claim 10, further comprising a biological fluid comprising cells within the pocket.

15. A cell washer comprising:
    a vessel configured to hold cells, the vessel comprising an elongated body including an opening, an inner surface, an outer surface, a cavity, and a pocket, the outer surface having a cylindrical profile and terminating in a hemispherical bottom, the pocket defined by a first inner surface portion of the inner surface disposed between and radially outward relative to a second inner surface portion and a third inner surface portion of the inner surface, the first, second, and third inner surface portions having cylindrical profiles, and the elongated body being thinner adjacent to the pocket than adjacent to the second and third inner surface portions;
    a rotor configured to rotate the vessel about an axis; and
    a conduit disposed inside the cavity, the conduit configured to pass through the opening and configured to transfer fluid to and from the cavity during the rotation of the vessel.

16. The cell washer of claim 15, further comprising a controller coupled to the conduit, the controller programmed to cause the conduit to transfer fluid from the cavity during the rotation of the vessel.

17. The cell washer of claim 16, wherein the controller is coupled to the rotor to control the rotation of the vessel.

18. The cell washer of claim 17, further comprising a probe arranged and configured to be reversibly lowered through the opening into the cavity.

19. The cell washer of claim 15, further comprising a lip which surrounds the opening.

20. The cell washer of claim 1, further comprising a lip which surrounds the opening.

21. The cell washer of claim 1, wherein the controller is further programmed to cause the cell washer to:
    a) dispense a sample of cells into the vessel through a probe;
    b) rotate the vessel about the axis of the vessel using the actuating device at a first speed;

c) displace the cells into the pocket by dispensing a wash liquid at a first rate;
d) sediment the cells within the pocket;
e) add additional wash liquid at a second rate into the vessel through the conduit to wash the cells while the vessel is rotating, wherein the first rate is greater than the second rate; and
f) aspirate at least a portion of the wash liquid out from the vessel through the conduit while the vessel is rotating.

22. The cell washer of claim 1, the cylindrical profile of the first inner surface portion is defined by a first radius and the cylindrical profile of the second and third inner surface portions are defined by a second radius that is less than the first radius.

\* \* \* \* \*